(12) United States Patent
Murase et al.

(10) Patent No.: US 12,076,934 B2
(45) Date of Patent: Sep. 3, 2024

(54) MANUFACTURING METHOD FOR FLUID CONTROL APPARATUS

(71) Applicant: CKD CORPORATION, Komaki (JP)

(72) Inventors: Hiroyuki Murase, Komaki (JP); Atsushi Tsuneduka, Komaki (JP)

(73) Assignee: CKD CORPORATION, Komaki (JP)

( * ) Notice: Subject to any disclaimer, the term of this patent is extended or adjusted under 35 U.S.C. 154(b) by 450 days.

(21) Appl. No.: 17/605,488

(22) PCT Filed: May 28, 2020

(86) PCT No.: PCT/JP2020/021071
§ 371 (c)(1),
(2) Date: Oct. 21, 2021

(87) PCT Pub. No.: WO2020/246359
PCT Pub. Date: Dec. 10, 2020

(65) Prior Publication Data
US 2022/0194015 A1    Jun. 23, 2022

(30) Foreign Application Priority Data

Jun. 5, 2019 (JP) .................................. 2019-105707

(51) Int. Cl.
*B29C 65/00* (2006.01)
*B29C 65/16* (2006.01)
(Continued)

(52) U.S. Cl.
CPC .... *B29C 65/1612* (2013.01); *B29C 66/81267* (2013.01); *B29C 65/00* (2013.01);
(Continued)

(58) Field of Classification Search
CPC ......... B29C 65/00; B29C 65/02; B29C 65/14; B29C 65/1412; B29C 65/1448
See application file for complete search history.

(56) References Cited

U.S. PATENT DOCUMENTS 6,715,733 B2 * 4/2004 Wang .................. F16K 99/0015
137/859
8,584,703 B2 * 11/2013 Kobrin ................ F16K 99/0015
251/61
(Continued)

FOREIGN PATENT DOCUMENTS

JP      2016-065560 A    4/2016
KR      10-1267829 B1    5/2013

OTHER PUBLICATIONS

Mar. 14, 2023 Office Action issued in Korean Patent Application No. 10-2021-7037815.
(Continued)

*Primary Examiner* — Philip C Tucker
*Assistant Examiner* — Nickolas R Harm
(74) *Attorney, Agent, or Firm* — Oliff PLC

(57) ABSTRACT

A manufacturing method is provided for a fluid control apparatus, in which the flow of a fluid is controlled by bringing a diaphragm valve element into contact with or separating the diaphragm valve element from a valve seat. The diaphragm valve element may be a joint body that is a combination of (a) a seat member that makes contact with the valve seat and (b) a body member. The joint body is formed by machining a material joint body obtained by welding together a seat-member material which is a material for the seat member and a body member material which is a material for the body member. The welding is performed on contact faces of the seat-member material and the body-member material of the material joint body in a range wider than contact faces of the seat member and the body member of the joint body.

10 Claims, 22 Drawing Sheets

(51) Int. Cl.
  *B29C 65/02* (2006.01)
  *B29C 65/14* (2006.01)
  *B29L 31/00* (2006.01)
  *F16K 1/36* (2006.01)
  *F16K 1/42* (2006.01)
  *F16K 31/122* (2006.01)

(52) U.S. Cl.
  CPC .............. *B29C 65/02* (2013.01); *B29C 65/14* (2013.01); *B29C 65/1412* (2013.01); *B29C 65/1448* (2013.01); *B29L 2031/7506* (2013.01); *F16K 1/36* (2013.01); *F16K 1/42* (2013.01); *F16K 31/122* (2013.01)

(56) References Cited

U.S. PATENT DOCUMENTS

2011/0286885 A1* 11/2011 Park .................... F16K 99/0001
                                                    216/33
2017/0102089 A1* 4/2017 Griffin, Jr. ............ F16K 27/102

OTHER PUBLICATIONS

Dec. 7, 2021 International Preliminary Report on Patentability issued in Patent Application No. PCT/JP2020/021071.
Aug. 4, 2020 International Search Report issued in Patent Application No. PCT/JP2020/021071.

* cited by examiner (a)

(b)

(c)

(d)

MANUFACTURING METHOD FOR FLUID CONTROL APPARATUS

CROSS-REFERENCE

This application is a US national phase application of International Application No. PCT/JP2020/021071, filed on May 28, 2020, and claiming the priority of Japanese Application No. 2019-105707, filed Jun. 5, 2019, whose entire disclosures are incorporated herewith by reference.

TECHNICAL FIELD

The present invention relates to a manufacturing method for a fluid control apparatus that controls flow of a fluid by bringing a valve element into or out of contact with a valve seat.

BACKGROUND ART

As a fluid control apparatus controlling flow of a fluid by bringing a valve element into or out of contact with a valve seat, for example, a chemical liquid valve performing flow rate control for chemical liquid which is used for a semiconductor manufacturing apparatus. In this chemical liquid valve, a diaphragm valve element to be in and out of contact with a valve seat has been adopted and the diaphragm valve element is brought to be into and out of contact with the valve seat by repetitive elastic deformation of a diaphragm part. For this reason, the diaphragm valve element is formed out of fluororesin having high bending endurance such as polytetrafluoroethylene (PTFE).

Herein, PTFE cannot be applied with injection molding, and thus powdery PTFE is compression-molded to form in a block shape and applied with machining to form the diaphragm valve element. However, when the powdery material is compression-molded, there is a possibility of dust emission due to the machining. The dust emission from the diaphragm valve element causes peeling-off of minute dirt from the diaphragm valve element by the repetitive contact and separation with the valve seat, resulting in generation of particles, and the particles could get into chemical liquid flowing in the chemical liquid valve. The particles have a possibility of influencing a yield of semiconductor manufacturing by for example, causing defects in a wiring pattern of a semiconductor, and thus there is need to prevent dust emission in the diaphragm valve element which could be a cause of particles generation.

To address this, as disclosed in the Patent Document 1, it has been considered to configure a diaphragm valve element by a joint body of a seat member to be in and out of contact with a valve seat and a body member provided with a diaphragm part. Specifically, the diaphragm valve element is configured such that the seat member is formed out of fluororesin (for example, tetrafluoroethylene perfluoroalkyl-vinyl ether copolymer (PFA)) as a low-dust-emission material and the seat member is welded to the body member which is fabricated by PTFE. Application of fluororesin as low-dust-emission material for the seat member can restrain dust emission caused by machining and can also prevent generation of particles.

RELATED ART DOCUMENTS

Patent Documents

Patent Document 1: JP2016-065560A

SUMMARY OF INVENTION

Problems to be Solved by the Invention

However, the above-mentioned conventional technique has the following problem. A conventional diaphragm valve element 41 is formed with a body member 411 provided with a diaphragm part 411a and an annular seat member 412 as shown in FIG. 17, for example. The body member 411 and the seat member 412 are both formed by injection molding and others, and then welded to each other by laser beam 45 irradiated from a light source 44 to configure the diaphragm valve element 41.

In this diaphragm valve element 41, however, entire contact faces of the body member 411 and the seat member 412 cannot be welded. This is because if the entire contact faces are welded as shown in FIG. 19, spillover 43a of resin occurs in a welded portion 43 and the spillover 43a could peel off to become particles. In order not to generate the spillover 43a which could be a cause of particles, as shown in FIG. 18, a welded portion 42 is formed on the seat member 412 except an outer periphery, an inner periphery, and their vicinity so that the vicinity of the outer periphery and the vicinity of the inner periphery of the seat member 412 are not welded. When the vicinity of the outer periphery and the vicinity of the inner periphery are not welded, there is created a clearance between the body member 411 and the seat member 412 in the vicinity of the outer periphery and the vicinity of the inner periphery. This clearance could be a cause of residence or stagnation of chemical liquid flowing in the chemical liquid valve. When the chemical liquid resides, the thus resided chemical liquid gets degraded to solidify components of the chemical liquid, which could be particles. The particles could, for example, give a bad influence on the yield of semiconductor manufacturing by causing defects in the wiring pattern of the semiconductor, for example.

Further, the Patent Document 1 also discloses a case of forming the valve seat by a joint body of a valve main body 46 and a seat member 47 as shown in FIG. 20, for example. The seat member 47 is formed out of PFA as low-dust-emission material. The seat member 47 is welded to the valve main body 46 made of PTFE by the laser beam 45 irradiated from the light source 44. In this case, too, however, entire contact faces of the valve main body 46 and the seat member 47 cannot be welded for prevention of spillover of resin on a welded portion. As a result of this, there is created a clearance between the valve main body 46 and the seat member 47, which could cause residence of the chemical liquid in the clearance. This problem is the same with a case of configuring the above-mentioned diaphragm valve element 41 by the joint body of the body member 411 and the seat member 412.

The present invention has been made to solve the above problem and has a purpose of providing a manufacturing method for a fluid control apparatus which can prevent generation of fluid residence in a manner that a valve element and a valve seat configured by welding a seat member and a body member has no clearance between the seat member and the body member.

Means of Solving the Problems

A manufacturing method for a fluid control apparatus according to one embodiment of the present invention has the following configuration. (1) There is provided a manufacturing method for a fluid control apparatus that controls flow of a fluid by bringing a valve element into or out of contact with a valve seat, wherein any one of the valve element and the valve seat is a joint body of a seat member to be in contact with the other one and a body member, the joint body is formed by machining a material joint body that is formed by welding of a seat-member material as a material for the seat member and a body-member material as a material for the body member, and the welding is performed on contact faces of the seat-member material and the body-member material of the material joint body in a range wider than contact faces of the seat member and the body member of the joint body.

Herein, the fluid control apparatus indicates an apparatus performing flow rate control and pressure control of a fluid that is to be output from the fluid control apparatus by controlling flow of the fluid that has been input in the fluid control apparatus.

In the above-configured manufacturing method for the fluid control apparatus, any one of the valve element and the valve seat is the joint body of the seat member contacted with the other one and the body member. Further, the joint body is formed by machining the material joint body which is formed by welding of the seat-member material as a material for the seat member and the body-member material as a material for the body member. This welding of the seat-member material and the body-member material is performed in an area wider than the contact faces of the seat member and the body member of the joint body. In other words, contact faces of the seat member and the body member after machining is formed within a range of an area where the seat-member material and the body-member material are welded. Accordingly, the entire contact faces of the seat member and the body member can be welded without generating spillover of resin on the welded portion, which has been generated conventionally. This welding over the entire contact faces of the seat member and the body member results in no clearance between the seat member and the body member, and thus it is possible to prevent generation of residence of chemical liquid that has been conventionally concerned.

If generation of residence can be prevented, it is possible to restrain possibility of solidification of components of the chemical liquid which could result in particles. This leads to reduction in possibility of giving a bad influence on the yield of semiconductor manufacturing such as causing defects in the wiring pattern of the semiconductor.

Effects of the Invention

According to the manufacturing method for the fluid control apparatus of the present invention, the valve element or the valve seat configured by welding of the seat member and the body member has no clearance between the seat member and the body member, and thus it is possible to prevent generation of residence of the fluid (for example, chemical liquid).

MODE FOR CARRYING OUT THE INVENTION

First Embodiment

Figure 1:
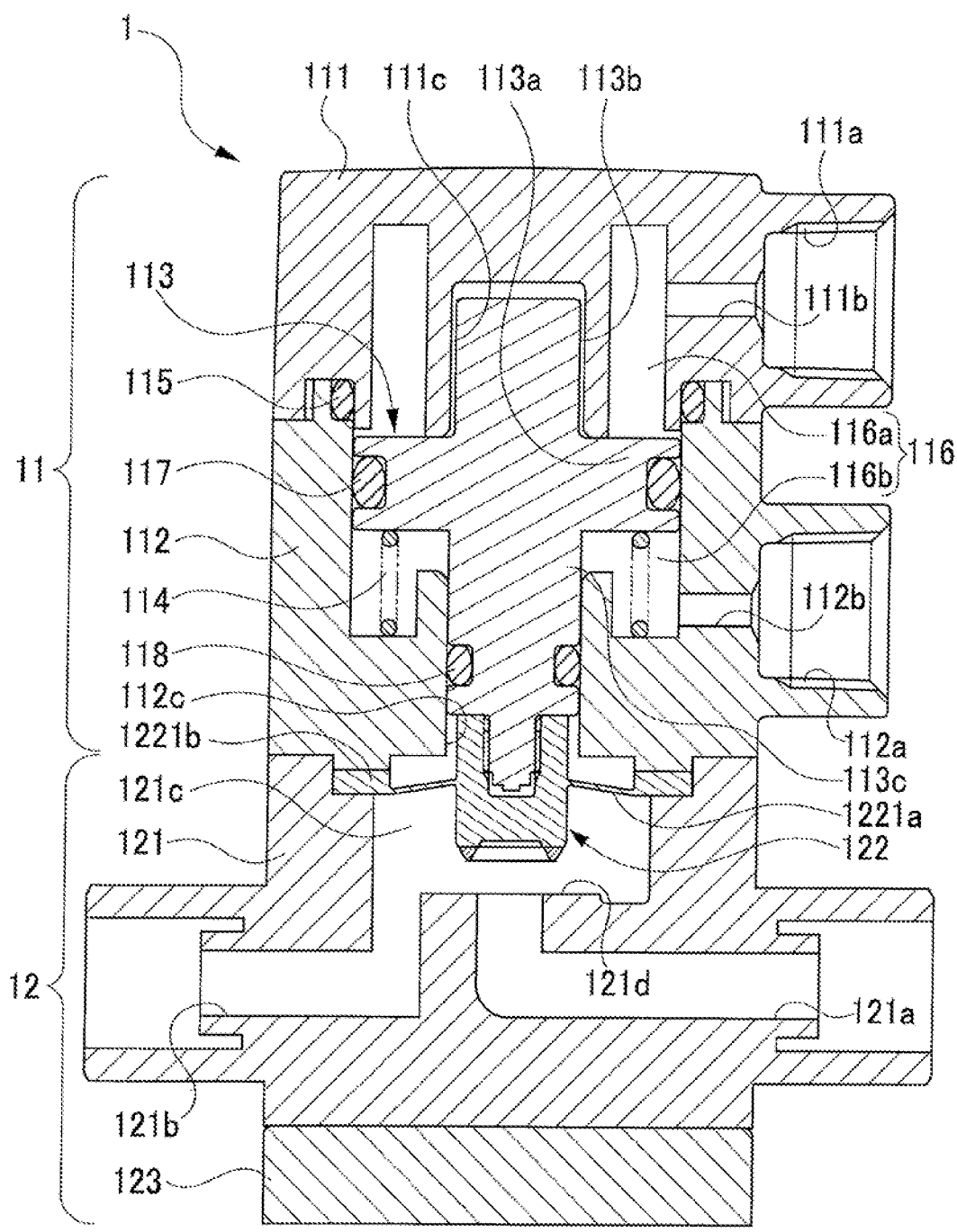
FIG. 1 is a sectional view of a fluid control apparatus in a first embodiment.

A first embodiment of a manufacturing method for a fluid control apparatus according to the present invention is now explained in detail with reference to the accompanying drawings. The fluid control apparatus according to the first embodiment is, for example, a chemical liquid valve 1 performing flow rate control of chemical liquid which is used for a semiconductor manufacturing process, and the chemical liquid valve 1 is formed of a drive section 11 and a valve section 12 as shown in FIG. 1.

The drive section 11 includes a first housing 111 and a second housing 112 and further includes a piston 113 therein. The first housing 111 is of a tubular shape with an upper end closed and a lower end opening in FIG. 1. An outer circumferential surface is provided with a first supply-and-exhaust port 111a. Further, the lower end of the first housing 111 in FIG. 1 is hermetically fitted with an upper end of the second housing 112 in FIG. 1 via an O-ring 115.

The second housing 112 is of a tubular shape with both upper and lower ends in FIG. 1 opening and is provided with a second supply-and-exhaust port 112a on its outer circumferential surface. The first housing 111 and the second housing 112 are arranged coaxially, and a hollow portion of the first housing 111 and a hollow portion of the second housing 112 constitute a piston chamber 116.

The piston chamber 116 is loaded with the piston 113 in a slidable manner in an upper and lower direction in FIG. 1. Herein, the upper direction in FIG. 1 represents a valve-opening direction and the lower direction in FIG. 1 represents a valve-closing direction. The piston chamber 116 is divided into an upper chamber 116a and a lower chamber 116b by a piston part 113a of the piston 113. There is placed an O-ring 117 between an outer circumference of the piston part 113a and an inner wall of the piston chamber 116 so that the upper chamber 116a and the lower chamber 116b are kept hermetical to each other.

The upper chamber 116a is communicated with the first supply-and-exhaust port 111a by a passage 1/1b and the lower chamber 116b is communicated with the second supply-and-exhaust port 112a by a passage 112b. The lower chamber 116b is provided with a coil spring 114. A lower end portion of the coil spring 114 in FIG. 1 is contacted with a bottom surface of the lower chamber 116b, and an upper end portion of the coil spring 114 in FIG. 1 is contacted with a lower end surface of the piston part 113a. The coil spring 114 urges the piston 113 in the valve-closing direction by its elastic force.

Further, the piston 113 is provided on an upper end side and a lower end side of the piston part 113a with a first piston rod 113b and a second piston rod 113c, respectively.

The first piston rod 113b is inserted in a groove portion 1/1c provided on a lower-face side of the first housing 111 in FIG. 1. Thus, the piston 113 is guided by the groove portion 111c when sliding in the upper and lower direction in FIG. 1.

The second piston rod 113c is inserted in a through hole 112c passing through the lower end face of the second housing 112 and the lower chamber 116b. There is provided an O-ring 118 between an outer circumferential surface of the second piston rod 113c and an inner circumferential surface of the through hole 112c to keep the lower chamber 116b hermetical. Further, on a leading end portion of the second piston rod 113c, a diaphragm valve element 122 (one example of a valve element) configuring the valve section 12 is threaded.

The valve section 12 is coupled on a lower side of the drive section 11 in FIG. 1 and is configured with a valve main body 121, the diaphragm valve element 122, and a base 123. The valve main body 121 is provided with an input passage 121a in which fluid such as chemical liquid is input and an output passage 121b from which the input fluid is to be output. Further, a valve chamber 121c is formed in a drilled manner in a center of an upper end face of the valve main body 121 in FIG. 1 so that the valve chamber 121c communicates the input passage 121a with the output passage 121b. On a bottom surface of the valve chamber 121c, a valve seat 121d to be in and out of contact with the diaphragm valve element 122 is formed.

Figure 2:
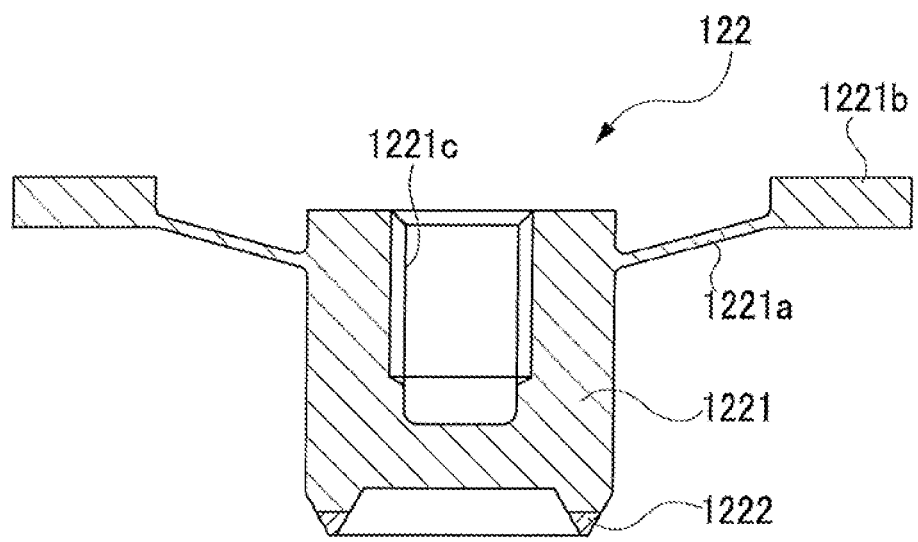
FIG. 2 is a sectional view of a diaphragm valve element of the fluid control apparatus in the first embodiment.

The diaphragm valve element 122 is, as shown in FIG. 2, a joint body of a body member 1221 and a seat member 1222 which is to be in and out of contact with the valve seat 121d.

The body member 1221 is provided with a diaphragm part 1221a to be elastically deformed in association with up and down movement of the diaphragm valve element 122. Further, the body member 1221 is provided on an outer circumference of the diaphragm part 1221a with a fixing part 1221b. As shown in FIG. 1, the fixing part 1221b is held from an upper and lower direction in FIG. 1 by the second housing 112 and the valve main body 121. On an upper end face of the body member 1221, a thread portion 1221c is formed in a drilled manner and threaded with a leading end portion of the second piston rod 113c as mentioned above.

Figure 3:
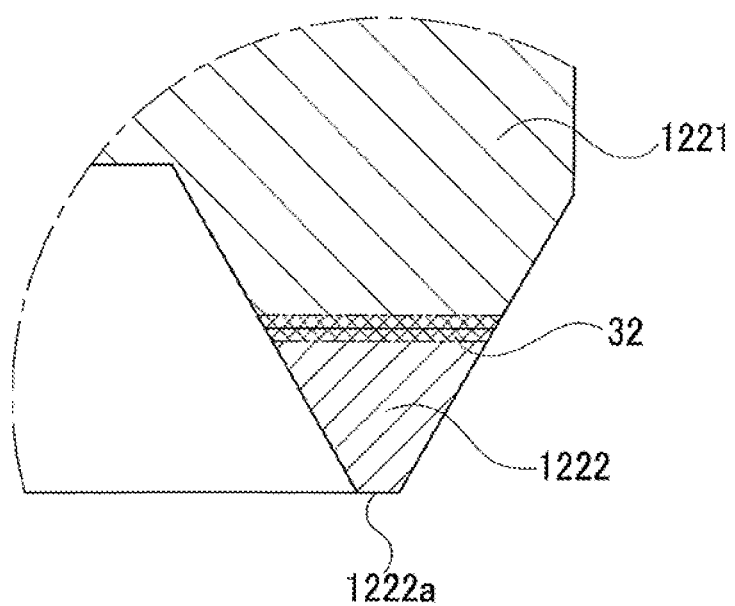
FIG. 3 is an enlarged view of a welded portion of a body member and a seat member in the first embodiment.

The seat member 1222 is welded to the body member 1221, and as shown in FIG. 3, contact faces of the body member 1221 and the seat member 1222 constitute a welded portion 32. The other face of the seat member 1222 on an opposite side from the welded side constitutes an abutment surface 1222a to be abutted on the valve seat 121d.

The diaphragm valve element 122 as the joint body of the body member 1221 and the seat member 1222 as mentioned above is formed by machining, and more specifically, formed as explained below.

Figure 4:
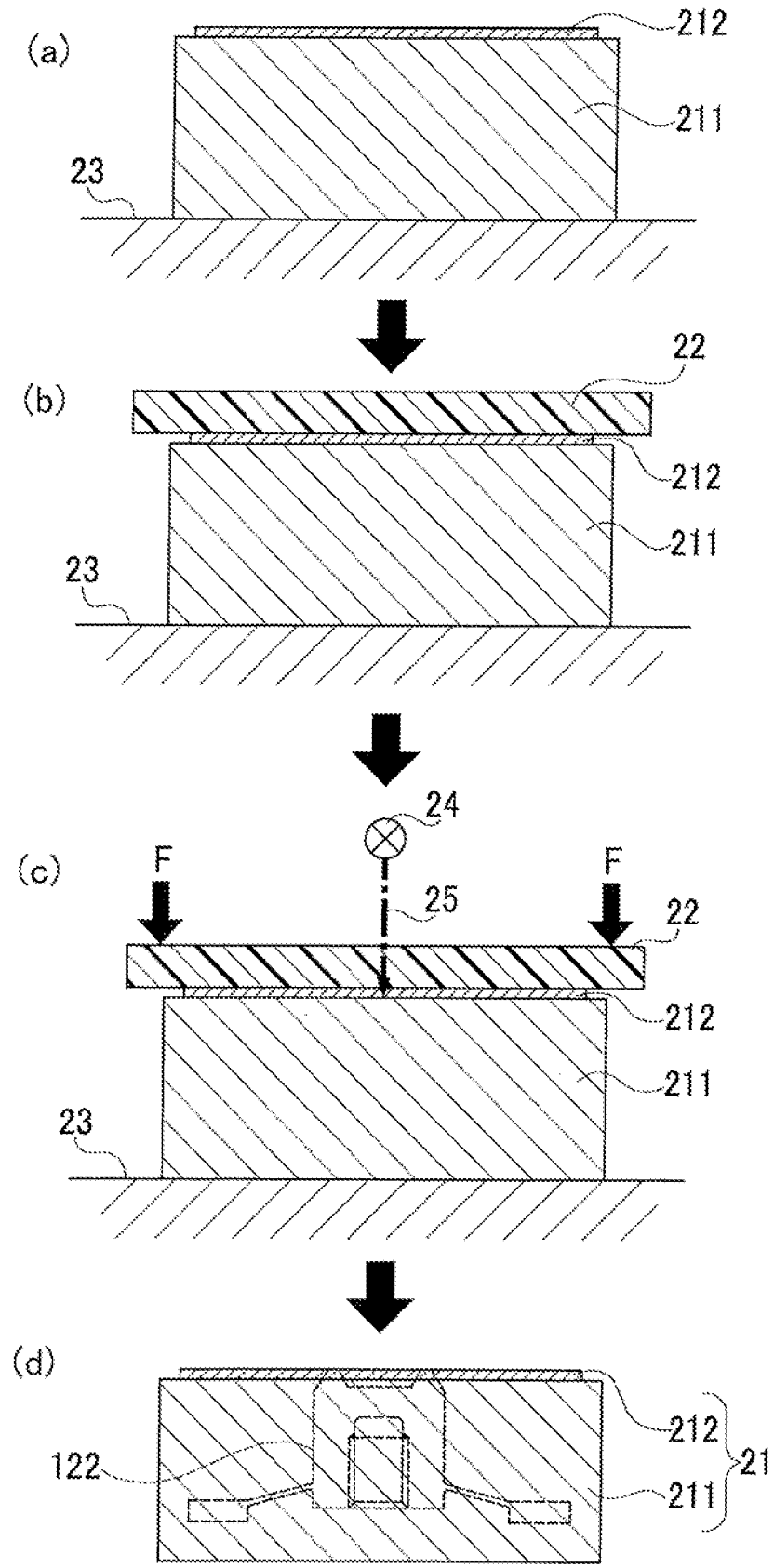
FIG. 4 is an explanatory view explaining a process of manufacturing the diaphragm valve element in the first embodiment by welding by use of infrared beam through steps of (a) to (d)

Firstly, as shown in FIG. 4 (a), a block-shaped body-member material 211 as a material for the body member 1221 is placed to be in contact with facing a support member 23. A plate-like seat-member material 212 as a material for the seat member 1222 is placed to be in contact with the body-member material 211 as overlapping thereon. The body-member material 211 is, for example, a compression-molding product of PTFE with high chemical resistance. The seat-member material 212 is, for example, an extrusion-molding product of PFA.

Subsequently, as shown in FIG. 4 (b), on the thus overlapped body-member material 211 and the seat-member material 212, an infrared-ray transmissive solid 22 having heat-sink function is placed to be in contact with the seat-member material 212 on an opposite side from the support member 23. As the infrared-ray transmissive solid 22, for example, materials for infrared crystal having heat conductivity of 15 W/m·K or more such as zinc selenium (ZnSe), zinc sulfide (ZnS), silicone (Si), germanium (Ge), sapphire ($Al_2O_3$), or gallium arsenide (GaAs) are applied.

Then, as shown in FIG. 4 (c), the body-member material 211 and the seat-member material 212 are closely contacted by applying a compression force in a direction indicated with arrows F, and infrared beam 25 from a light source 24 is irradiated on the body-member material 211 and the seat-member material 212 from a side of the infrared-ray transmissive solid 22.

Herein, a wavelength region of the infrared beam 25 is from 0.37 μm to 15 μm, and preferably, CO2 laser with a wavelength of 10.6 μm or 10.6±0.5 μm, or CO laser with a wavelength of 5.3 μm or 5.3±0.5 μm, or a semiconductor laser with a wavelength from 375 to 2000 nm. In a case of the semiconductor laser, the laser is preferably YAG laser with a wavelength of 1.06 μm or 1.06±0.5 μm, or fiber laser with a wavelength of 1.07 μm or 1.07±0.5 μm, or thulium laser with a wavelength of 2.05 μm or 2.05±0.5 μm.

When the infrared beam 25 is irradiated, while a temperature at a boundary of the infrared-ray transmissive solid 22 and the seat-member material 212 decreases, a temperature at a boundary of the body-member material 211 and the seat-member material 212 becomes the highest. Namely, an inside of the boundary can reveal a high-temperature area owing to the infiltrated infrared-ray energy. As a result of this, the body-member material 211 and the seat-member material 212 can be welded in a short time while restraining deterioration in surface property due to thermal damage such as extreme contraction, tear, hideous burning, and thermal decomposition on a surface layer on an infrared-ray irradiation side of the seat-member material 212 to the most. By this welding of the body-member material 211 and the seat-member material 212, a material joint body 21 is formed.

Finally, as shown in FIG. 4 (d), the material joint body 21 is machined to be in a shape as indicated with a broken line, and thus the diaphragm valve element 122 is formed.

Herein, the abutment surface 1222a of the seat member 1222 (see FIG. 3) is not formed by machining but formed to be kept as a molded surface of the seat-member material 212.

For example, if the abutment surface 1222a is formed by machining, trail of cutting blade remains on the machined abutment surface 1222a. This trail of cutting blade creates minute recesses and protrusions on a surface of the abutment surface 1222a, which could make a surface roughness rougher. When the abutment surface 1222a with the rougher surface repeats operation of contact and separation with the valve seat 121d, the above-mentioned minute protrusions would come off to result in particles.

To address this, the present invention is configured such that the abutment surface 1222a is formed by the molded face by the extrusion molding in order to prevent the surface roughness from becoming rougher. Therefore, even when the abutment surface 1222a repeats contact and separation with the valve seat 121d, particles are hardly generated.

The seat-member material 212 of the present embodiment is made from the extrusion product of PFA, but the material may be made from an injection-molding product of PFA. However, when the seat-member material 212 is molded by injection molding, the surface roughness of the abutment surface 1222a is influenced by surface roughness of a die component and the die component gets filled with gas to cause burning on the abutment surface, so that the surface roughness could get rougher. Accordingly, it is most preferable to mold the seat-member material 212 by extrusion molding that is not influenced by the die component.

Further, when the body-member material 211 and the seat-member material 212 are welded to form the material joint body 21, welding by the infrared beam 25 is performed over a wide range wider than the contact surfaces of the body member 1221 and the seat member 1222 of the diaphragm valve element 122 which has been formed by machining.

Figure 5:
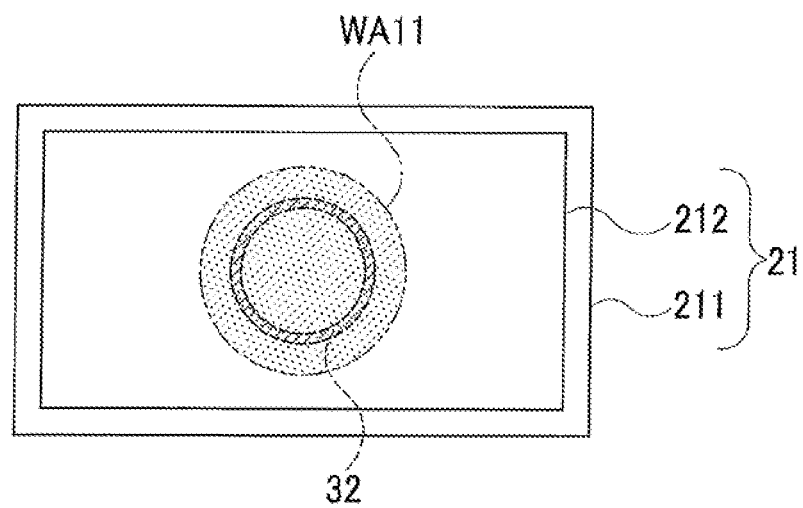
FIG. 5 is an explanatory view explaining a range of welding by the infrared beam.

To be more specific, as mentioned above, the contact faces of the body member 1221 and the seat member 1222 of the diaphragm valve element 122 that has been formed by machining constitute the welded portion 32. This welded portion 32 is imaginarily depicted over the material joint body 21 as an area encircled by a broken line in a top view of FIG. 5. Further, when an area of welding by the infrared beam 25 is imaginarily depicted on the material joint body 21 in a top view, the range is a welding range WA11 encircled by a chain-dot line in FIG. 5. By performing the welding by the infrared beam 25 over a range wider than the area of the welded portion 32, the welded portion 32 is formed on the entire contact faces of the body member 1221 and the seat member 1222 as shown in FIG. 3. Accordingly, there is no clearance created between the body member 1221 and the seat member 1222 after machining. No clearance created between the body member 1221 and the seat member 1222 makes it possible to prevent generation of residence which has been conventionally concerned. If generation of residence can be prevented, it is further possible to prevent possibility of components of the chemical liquid from becoming particles due to deterioration in the resided chemical liquid, so that the possibility of causing defects in the wiring pattern of the semiconductor can be reduced.

Figure 6:
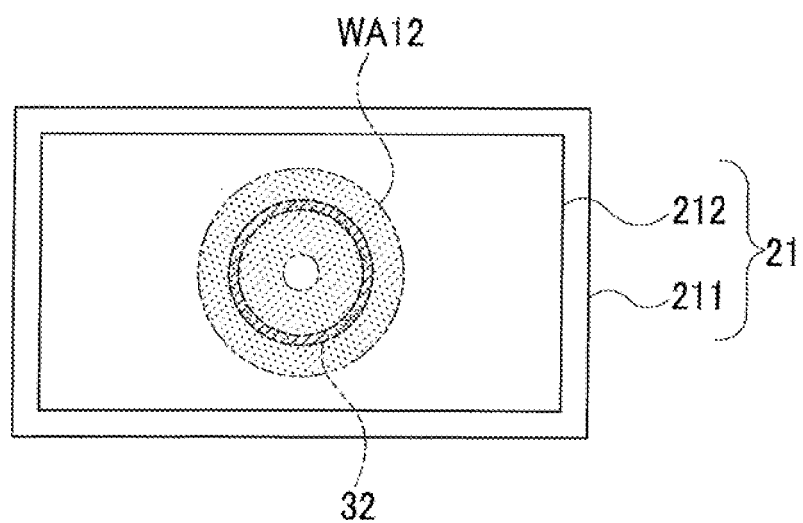
FIG. 6 is an explanatory view explaining the range of welding by the infrared beam in a modified example.

The range of performing welding by the infrared beam 25 only has to include the welded portion 32, and thus the area may be a welding range WA12 as indicated in FIG. 6, for example. Alternatively, the entire contact surfaces of the body-member material 211 and the seat-member material 212 may be welded.

Incidentally, the support body 23 used for welding by the infrared beam 25 is provided to maintain stable contact state of the infrared-ray transmissive solid 22, the body-member material 211, and the seat-member material 212 during irradiation by the infrared beam 25. Accordingly, as long as having this function, a material and a shape of the support member 23 is optional. For example, metal-made block or plate made of steel, aluminum alloy, copper alloy, and others, which are hardly elastically deformed by the compression force indicated with the arrows F (see FIG. 4 (c)) and have appropriate rigidity, is considered.

Further, the support member 23 may be provided with a buffer layer made of rubber on a surface layer on a side to be irradiated with the infrared beam 25. When thermal-plastic resin materials having thin thickness (PFA, PTFE, and others) are to be welded, or when thermal-plastic resin materials with high thermal contraction are to be welded, there are a possibility of shortage in contact pressure and shortage in a contact area of the infrared-ray transmissive solid 22 and the seat-member material 211 and a possibility of shortage in contact pressure and a contact area of the body-member material 211 and the seat-member material 212 due to surface roughness and others of the thermal-plastic resin material. This shortage in the contact pressure and the contact area could lead to generation of defects such as voids and tears, and contraction on the welded portion after welding. To address this, providing the buffer layer on the support member 23 makes it possible to improve the contact pressure and the contact area of the infrared-ray transmissive solid 22, the body-member material 211, and the seat-member material 212 and to prevent generation of defects such as voids and tears, excessive contraction after welding.

Other than welding by the above-mentioned infrared beam 25, the diaphragm valve element 122 may be formed by heat-plate welding which will be explained below. As explained in FIG. 7 (a), the body-member material 211 and the seat-member material 212 are placed with a heat plate 31 held therebetween so that both the materials are contacted with the heat plate 31. Thus, each end faces of the body-member material 211 and the seat-member material 212, which are in contact with the heat plate 31 respectively, are molten.

Figure 7:
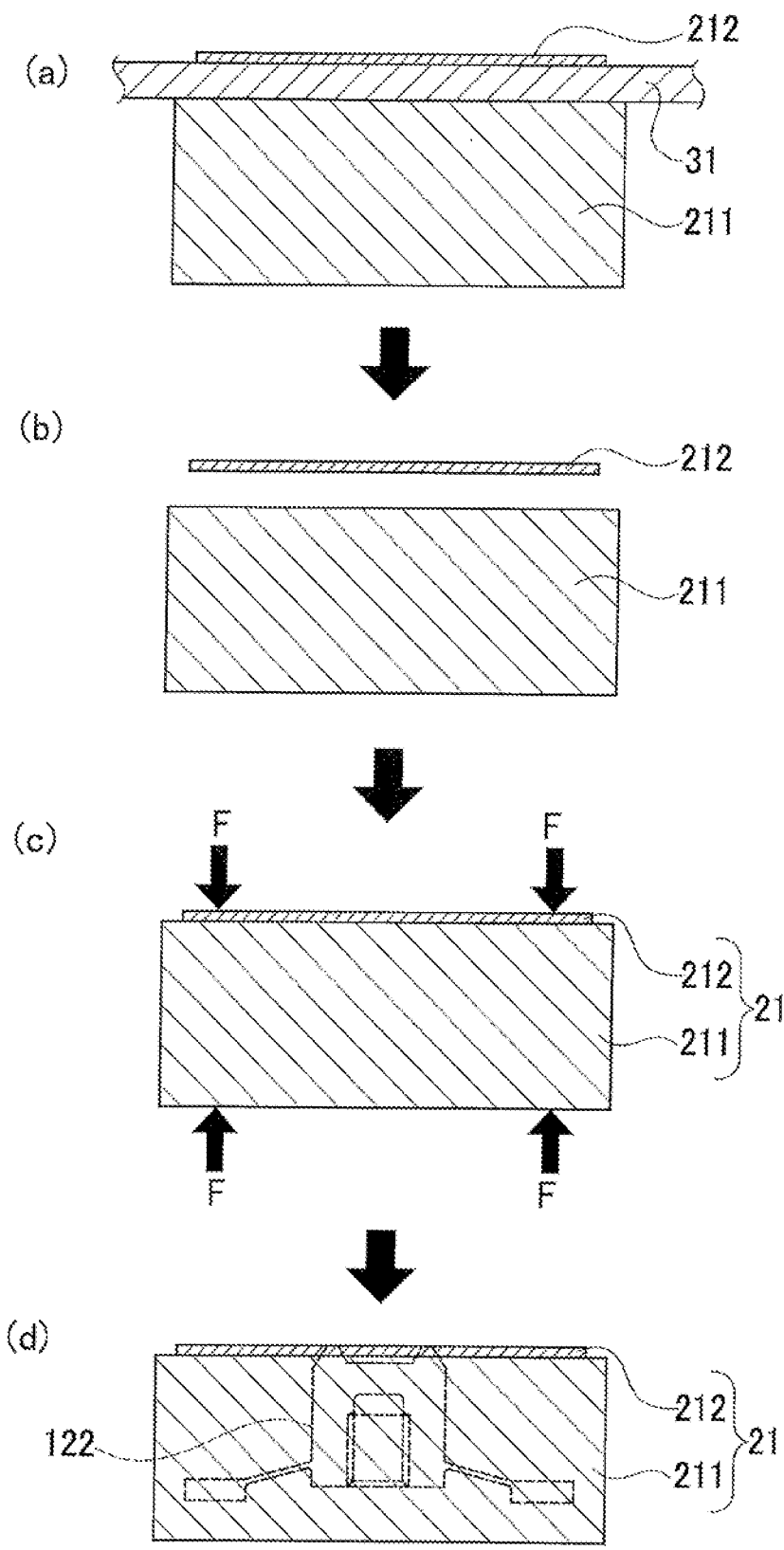
FIG. 7 is an explanatory view explaining a process of manufacturing the diaphragm valve element in the first embodiment by heat-plate welding through steps of (a) to (d)

Subsequently, after the heat plate 31 has been removed as shown in FIG. 7 (b), the molten faces of the body-member material 211 and the seat-member material 212 are brought into contact with each other as shown in FIG. 7 (c). Then, the body-member material 211 and the seat-member material 212 are compressed in a vertical direction (arrows F) with respect to the molten faces of the body-member material 211 and the seat-member material 212 and cooled down. In this manner, the body-member material 211 and the seat-member material 212 are welded to form the material joint body 21.

Thereafter, as shown in FIG. 7 (d), the material joint body 21 is machined to be in a shape indicated with a broken line so that the diaphragm valve element 122 is formed.

According to the above-mentioned heat-plate welding, the entire contact faces of the body-member material 211 and the seat-member material 212 are welded. Accordingly, the welding area is wider than the range of the welded portion 32 as the contact faces of the body member 1221 and the seat member 1222. Therefore, the welded portion 32 is, as shown in FIG. 3, formed over the entire contact surfaces of the body member 1221 and the seat member 1222. There is accordingly no clearance created between the body member 1221 and the seat member 1222. No clearance created between the body member 1221 and the seat member 1222 makes it possible to prevent generation of residence that has been conventionally concerned. Prevention of residence can further prevent possibility that the resided chemical liquid gets degraded to make the components of the chemical liquid turn particles, so that the possibility of defects in the wiring pattern of the semiconductor can be reduced.

Further, when the diaphragm valve element 122 is to be formed in a manner that the body member 1221 and the seat member 1222 are formed by injection molding and others and then welded, the seat member 1222 needs to be made positioning with respect to the body member 1221. If accurate positioning fails, there is a possibility that the seat member 1222 could be welded to the body member 1221 in a displaced manner. On the other hand, the diaphragm valve element 122 according to the present embodiment is formed by machining the material joint body 21 as mentioned above, and thus the seat member 1222 has no need to be positioned with respect to the body member 1221. Accordingly, there is no possibility that the seat member 1222 is welded to the body member 1221 in a displaced manner.

Operation of the chemical liquid valve 1 is now explained. The chemical liquid valve 1 shown in FIG. 1 is in a valve-open state. When operation air is supplied from an operation-air supply source (not-shown) to the first supply-and-exhaust port 111a in this state, the operation air is supplied to the upper chamber 116a through the passage 111b. With supply of the operation air, the pressure in the upper chamber 116a increases, and when the pressure applied to an upper end face of the piston part 113a exceeds the urging force of the coil spring 114, the piston 113 moves in a valve-closing direction (in a downward direction in FIG. 1) against the urging force of the coil spring 114. In association with this movement of the piston 113 in the valve-closing direction, the air inside the lower chamber 116b is compressed by the piston part 113a and discharged outside of the drive section 11 through the passage 112b and the second supply-and-exhaust port 112a. When the piston 113 is moved in the valve-closing direction, the diaphragm valve element 122 threaded with a leading end of the second piston rod 113c is moved in the valve-closing direction. Then, the abutment surface 1222a of the seat member 1222 abuts on the valve seat 121d, and thus the chemical liquid valve 1 is in a valve-closed state.

To the chemical liquid valve 1 in the valve-closed state, when supply of the operation air is halted, the pressure in the upper chamber 116a exerted against the urging force of the coil spring 114 ceases to work, so that the piston 113 is moved in a valve-opening direction by the urging force of the coil spring 114. The diaphragm valve element 122 threaded with the leading end of the second piston rod 113c is also moved in the valve-opening direction, so that the seat member 1222 is separated from the valve seat 121d to be in the valve-open state. At this time, the operation air filled in the upper chamber 116a is discharged outside the drive section 11 through the passage 1/1b and the first supply-and-exhaust port 111a, and to the lower chamber 116b, the air outside the drive section 11 enters through the second supply-and-exhaust port 112a and the passage 112b.

Figure 8:
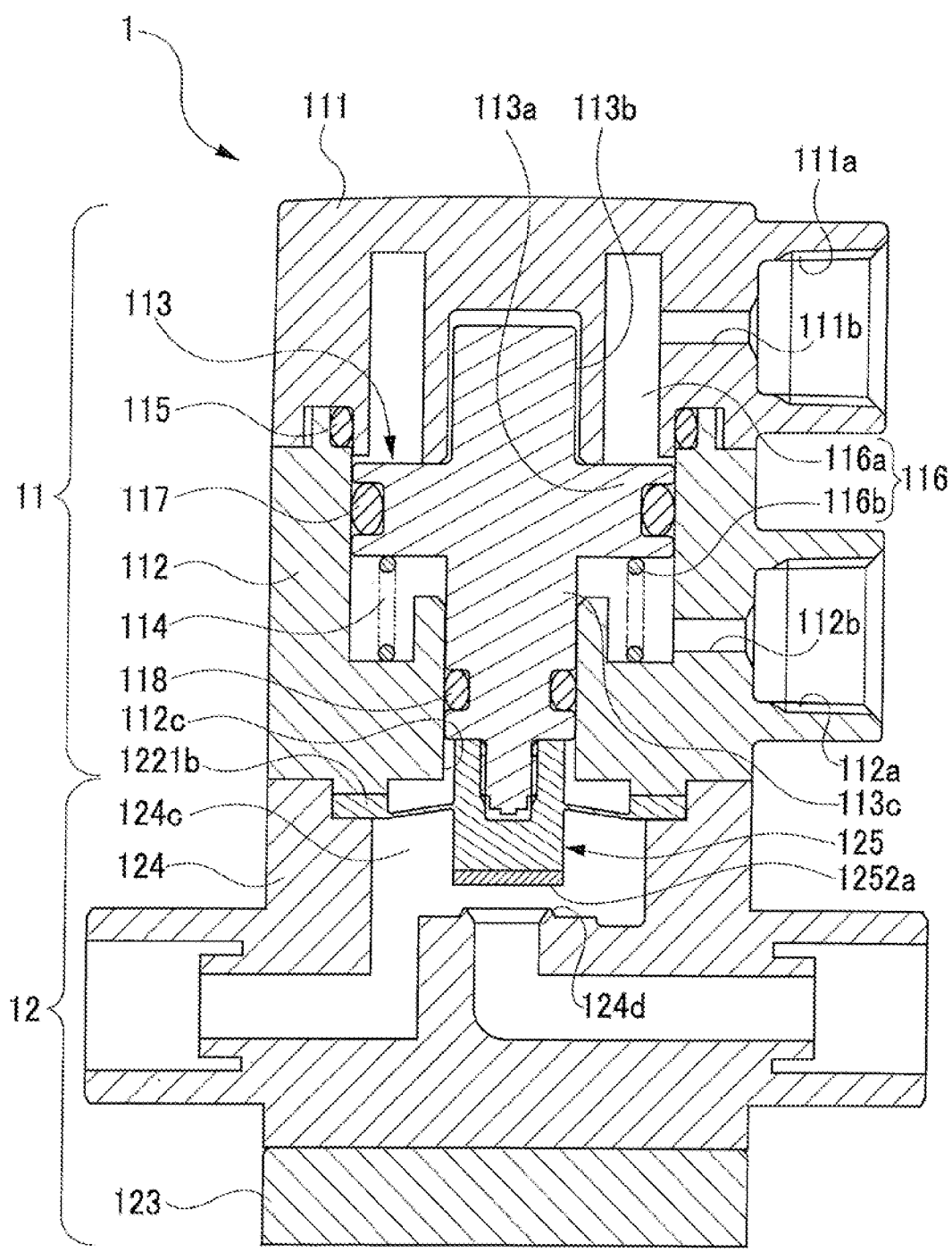
FIG. 8 is a view of a modified example of the fluid control apparatus in the first embodiment.
Figure 9:
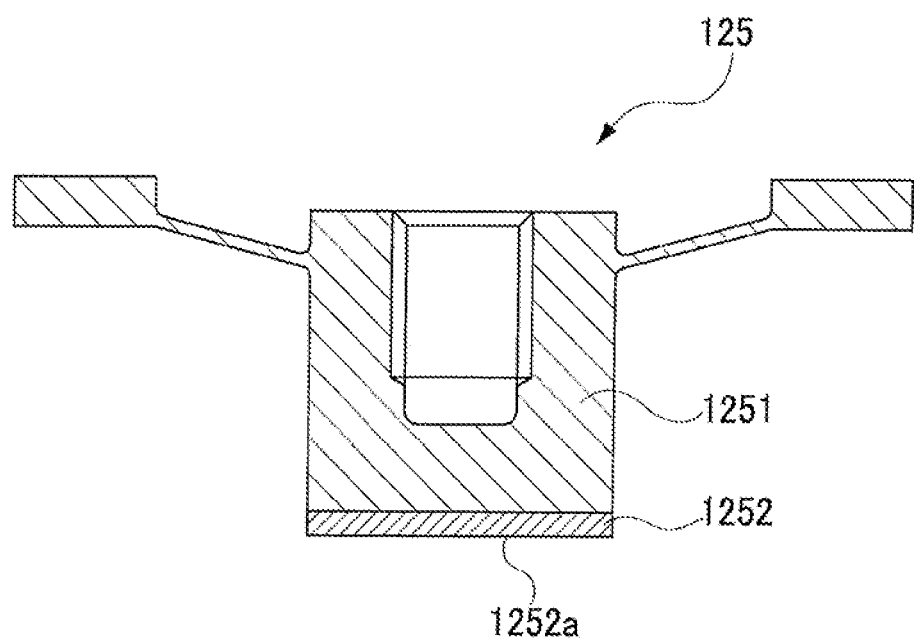
FIG. 9 is an enlarged view of the diaphragm valve element shown in FIG. 8.

Herein, in the above-mentioned first embodiment, the seat member 1222 configuring the diaphragm valve element 122 is formed annularly by machining the material joint body 21, but alternatively, the seat member 1222 may be formed in a plate-like shape as indicated as a seat member 1252 of a diaphragm valve element 125 shown in FIG. 8 and FIG. 9. This diaphragm valve element 125 is also formed by machining the material joint body 21 that is formed by welding of the body-member material 211 as a compression-molding product of PTFE with excellent chemical resistance and the seat-member material 212 as an extrusion-molding product of PFA. The welding is performed in a range wider than the contact faces of the body member 1251 and the seat member 1252. Further, an abutment surface 1252a of the seat member 1252 is constituted by the molded face as similar with the contact surface 1222a of the seat member 1222. A valve seat 124d to be in and out of contact with the thus configured diaphragm valve element 125 is formed on a bottom surface of a valve chamber 124c of a valve main body 124 in a protruding manner.

Figure 21:
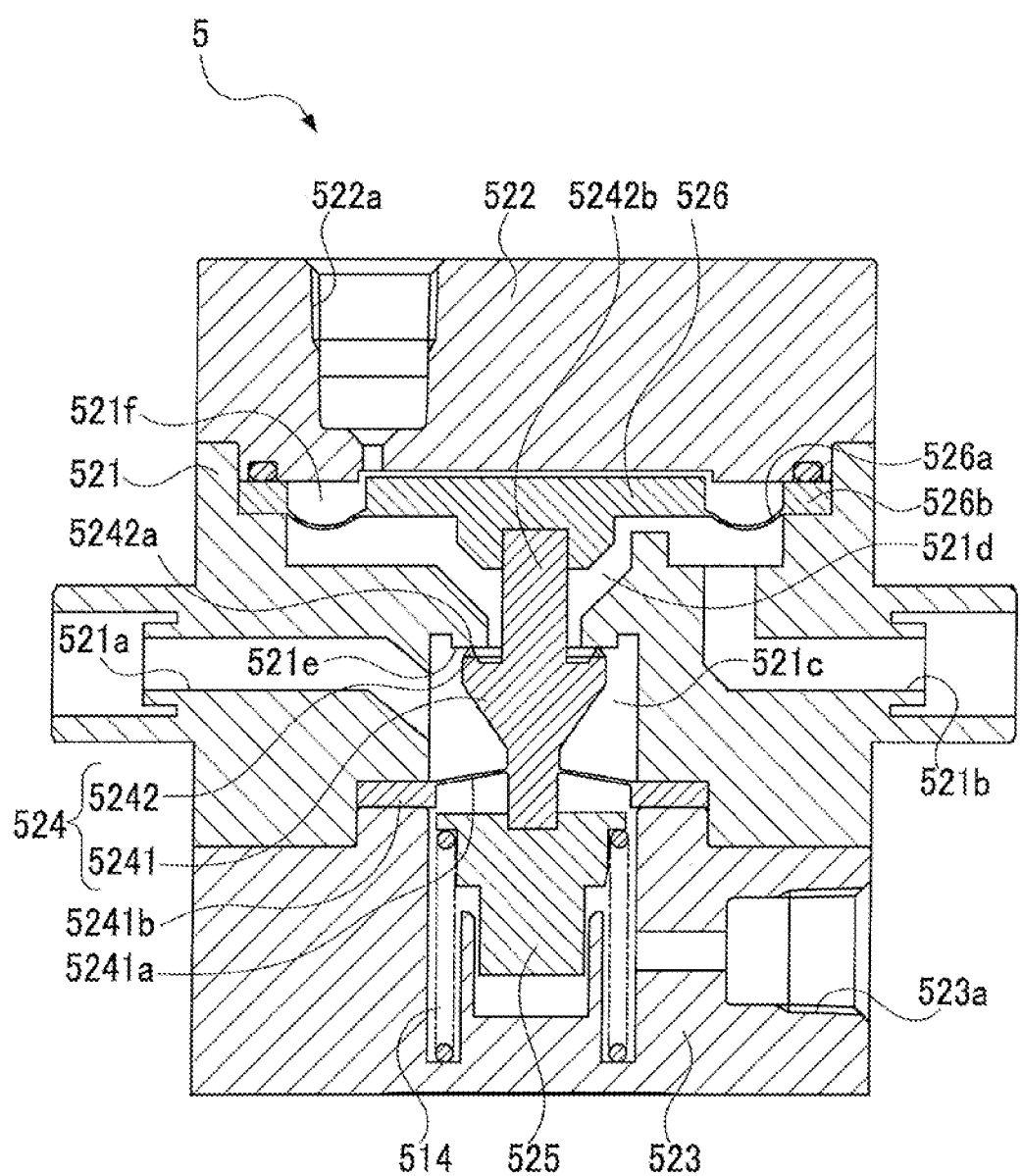
FIG. 21 is a view showing a modified example of the fluid control apparatus in the first embodiment.

The above-mentioned explanation has been made with the chemical liquid valve 1 performing flow rate control as an example of a fluid control apparatus, but the apparatus may be a fluid control apparatus performing pressure control. As the fluid control apparatus performing pressure control, there is a regulator 5 as shown in FIG. 21, for example. This regulator 5 is a fluid control apparatus used for a semiconductor manufacturing apparatus configured such that a diaphragm valve element 524 driven by operation air is to be in and out of contact with a vale seat 521e inside a valve main body 521 to perform the pressure control of fluid that is input from an input passage 521a and output from an output passage 521b.

Firstly a configuration of the regulator 5 is explained. The regulator 5 is configured by integrally assembling a valve main body 521, an upper cover 522, and a lower cover 523 by fastening members such as bolts to be in an almost rectangular-parallelepiped shape as a whole. The valve main body 521 is formed out of fluorine base synthetic resin, for example. The upper cover 522 and the lower cover 523 are formed out of polypropylene resin, for example.

The valve main body 521 is provided with an input passage 521a to input fluid and an output passage 521b to output the fluid that has been input in the input passage 521a.

In a center part on a lower end face of the valve main body 521 in FIG. 21, an upstream-side fluid chamber 521c is provided in a drilled matter, and in a center part on an upper face of the upstream-side fluid chamber 521c in FIG. 21, a valve seat 521e is provided. Further, in a center part on an upper end face of the valve main body 521 in FIG. 21, a downstream-side fluid chamber 521d communicated with the upstream-side fluid chamber 521c is provided in a drilled manner so that the input passage 521a and the output passage 521b are communicated via the upstream-side fluid chamber 521c and the downstream-side fluid chamber 521d.

In the upstream-side fluid chamber 521c and the downstream-side fluid chamber 521d, a diaphragm valve element 524 which can reciprocate in an upper and lower direction in FIG. 21 is housed. This diaphragm valve element 524 is a joint body of a body member 5241 and a seat member 5242.

The body member 5241 includes a diaphragm part 5241a which is elastically deformed in association with upper and lower movement of the diaphragm valve element 524. The body member 5241 is formed with a fixing part 5241b on an outer circumference of the diaphragm part 5241a and the fixing part 5241b is held and fixed in the upper and lower direction in FIG. 21 by the valve main body 521 and the lower cover 523. On an upper end portion of the body member 5241 in FIG. 21, a coupling shaft 5242b is provided and a diaphragm member 526 is press-fitted in the coupling shaft 5242b so that the diaphragm valve element 524 and the diaphragm member 526 is integrated.

The seat member 5242 is welded to the body member 5241 and contact faces of the body member 5241 and the seat member 5242 constitute a welded portion. This welded portion is, as similar with the welded portion 32 shown in FIG. 3, formed on the entire contact faces of the body member 5241 and the seat member 5242. Further, a surface on an opposite side from the welded side of the seat member 5242 constitutes an abutment surface 5242a to be abutted on the valve seat 521e. The abutment surface 5242a is, as similar with the diaphragm valve elements 122 and 125 used for the above-mentioned chemical liquid valve 1, formed by a molded face of a seat-member material 612 (see FIG. 22) as a material for the seat member 5242 to prevent generation of particles.

The diaphragm valve element 524 as a joint body of the above-mentioned body member 5241 and the seat member 5242 is formed by machining and more specifically formed as explained in detail below.

Figure 22:
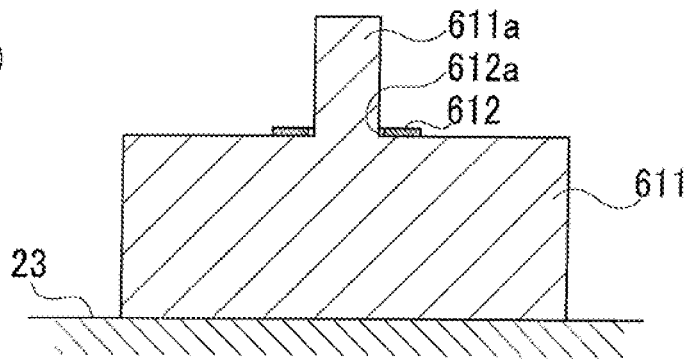
FIG. 22 is an explanatory view explaining a process of manufacturing the diaphragm valve element shown in FIG. 21 by welding by use of the infrared beam through steps of (a) to (d)
Figure 22:
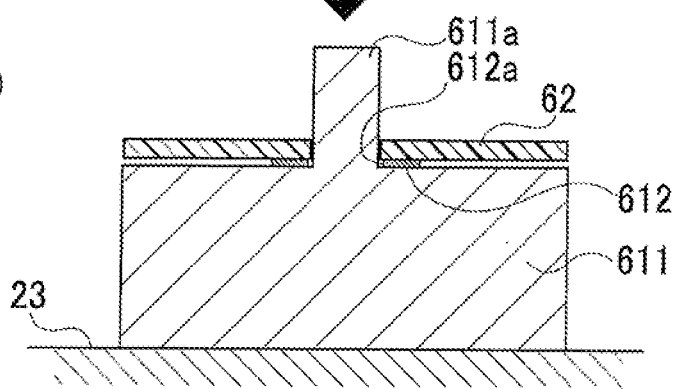
Figure 22:
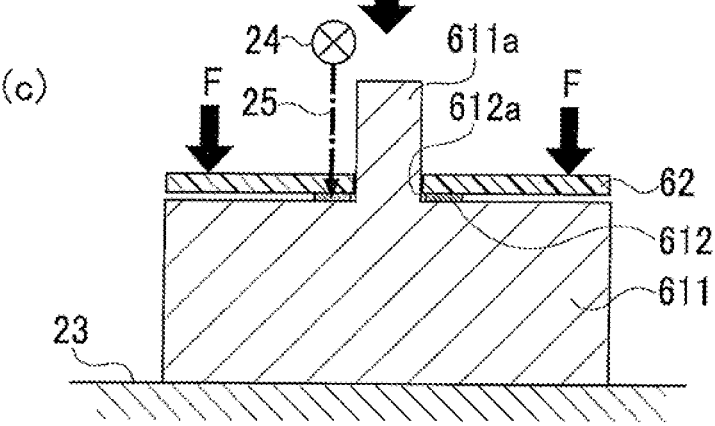
Figure 22:
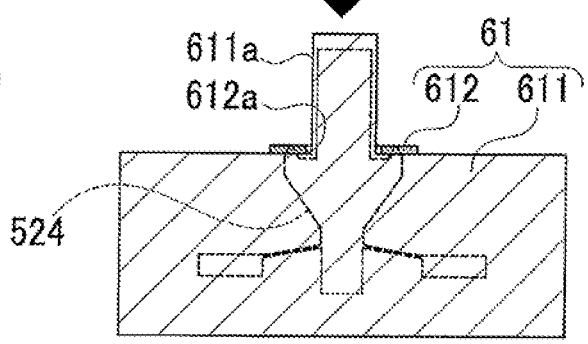

Firstly, as shown in FIG. 22 (a), a body-member material 611 as a material for the body member 5241 is placed to be in contact with facing the support member 23. The plate-like seat-member material 612 as a material for the seat member 5242 is placed to be in contact with the body-member material 611 as overlapping thereon. The body-member material 611 includes a protrusion 611a to constitute the coupling shaft 5242b, and accordingly the seat member 5242 includes a through hole 612a through which the protrusion 611a passes. Herein, the body-member material 611 is, for example, a compression-molding product of PTFE with high chemical resistance. The seat-member material 612 is, for example, an extrusion-molding product or an injection-molding product of PFA. When the seat-member material 612 is prepared as the extrusion-molding product, there is needed to process plate-like material to provide the through hole 612a.

Subsequently, as shown in FIG. 22 (b), on the thus overlapped body-member material 611 and the seat-member material 612, an infrared-ray transmissive solid 62 having heat-sink function is placed to be in contact with the seat-member material 612 on an opposite side from the support member 23.

Then, as shown in FIG. 22 (c), the body-member material 611 and the seat-member material 612 are closely contacted by applying a compression force in a direction indicated with the arrows F, and the infrared beam 25 from the light source 24 is irradiated on the body-member material 611 and the seat-member material 612 from a side of the infrared-ray transmissive solid 62. A material joint body 61 is thus formed by irradiating the infrared beam 25 to weld the body-member material 611 and the seat-member material 612. Welding by the infrared beam 25 is performed in a range wider than contact faces of the body member 5241 and the seat member 5242 of the diaphragm valve element 524 that is formed by machining. This is as similar with cases of the diaphragm valve elements 122 and 125 used for the above-mentioned chemical liquid valve 1. Accordingly, the entire contact faces of the body member 5241 and the seat member 5242 becomes the welded portion, and thus there is no clearance created between the body member 5241 and the seat member 5242, thereby preventing generation of residence of fluid (for example, chemical liquid).

Finally, as shown in FIG. 22 (d), the material joint body 61 is machined to be in a shape as indicated with a broken line, and thus the diaphragm valve element 524 is formed.

Figure 23:
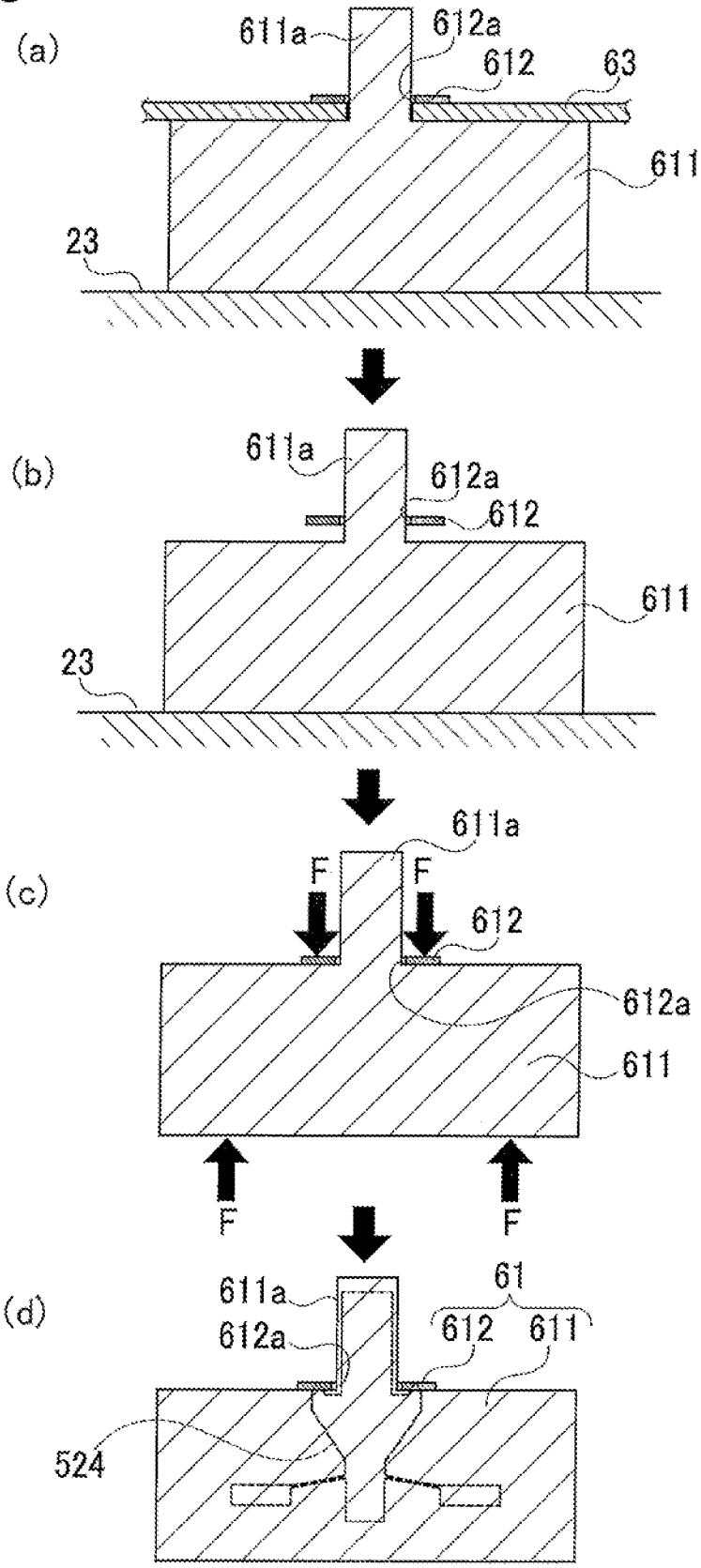
FIG. 23 is an explanatory view explaining a process of manufacturing the diaphragm valve element shown in FIG. 21 by the heat-plate welding through steps of (a) to (d)

Other than welding by the above-mentioned infrared beam 25, the diaphragm valve element 524 may be formed by heat-plate welding which will be explained below. As shown in FIG. 23 (a), the body-member material 611 and the seat-member material 612 are placed with a heat plate 63 held therebetween so that both the materials are contacted with the heat plate 63. Thus, the respective end faces of the body-member material 611 and the seat-member material 612, which are contacted with the heat plate 63, are molten.

Subsequently, after the heat plate 63 has been removed as shown in FIG. 23 (b), the molten faces of the body-member material 611 and the seat-member material 612 are brought into contact with each other as shown in FIG. 23 (c). Then, the molten faces of the body-member material 611 and the seat-member material 612 are compressed in a vertical direction (the arrows F) and cooled down. In this manner, the body-member material 611 and the seat-member material 612 are welded to form the material joint body 61.

Thereafter, as shown in FIG. 23 (d), the material joint body 61 is machined to be in a shape indicated with a broken line so that the diaphragm valve element 524 is formed.

The heat-plate welding creates no clearance between the body member 5241 and the seat member 5242, and thus it is possible to prevent generation of residence which has been conventionally concerned. This is as similar with the diaphragm valve elements 122 and 125 used for the above-mentioned chemical liquid valve 1.

Further, the diaphragm valve element 524 is formed by machining the material joint body 61, so that the seat member 5242 does not need to be positioned with respect to the body member 5241, and there is no possibility that the seat member 5242 is welded to the body member 5241 in a displaced state. This is also similar with the diaphragm valve elements 122 and 125 used for the above-mentioned chemical liquid valve 1.

Subsequently, the lower cover 523 accommodates a coil spring 514 in its inside. An end portion on an upper side of the coil spring 514 in FIG. 21 is contacted with a spring receiver 525 that is assembled to a lower end portion of the diaphragm valve element 524 in FIG. 21, and the diaphragm valve element 524 is urged upward in FIG. 21 by the urging force of the coil spring 514. Specifically, the urging force of the coil spring 514 maintains a contacted state of the seat member 5242, which constitutes the diaphragm valve element 524, contacted with the valve seat 521e.

The lower cover 523 is provided with an open port 523a to expose to the atmosphere in order to keep the space on a side below the diaphragm part 5241a in FIG. 21 (a lower space) to the atmospheric pressure. The open port 523a is connected with not-shown pipes, and thus the open port 523a can release the lower space to the atmosphere at a space which gives no bad influence on the semiconductor manufacturing apparatus. Owing to this, upper and lower movement of the diaphragm valve element 524 can be smoothly performed.

The diaphragm member 526 is provided with a diaphragm part 526a and its peripheral part 526b is held and fixed by the valve main body 521 and the upper cover 522. On an upper end face of the upper cover 522 in FIG. 21 is provided with an air supply port 522a. The air supply port 522a is communicated with a pressure operation chamber 521f as a space formed by the upper cover 522 and the diaphragm member 526. When the operation air is supplied by the pressure supply source to the air supply port 522a, the diaphragm member 526 moves vertically by elastic deformation of the diaphragm part 526a according to the operation pressure of the operation air.

Operation of the regulator 5 is now explained. In an initial state in which the operation air is not supplied to the regulator 5, the coil spring 514 urges the diaphragm valve element 524 upward in FIG. 21 via the spring receiver 525, and thus the regulator 5 is in a valve-closed state in which the diaphragm valve element 524 is contacted with the valve seat 521e. In this state, an upstream-side fluid chamber 521c and a downstream-side fluid chamber 521d are shut off, and communication of the fluid between the upstream-side fluid chamber 521c and the downstream-side fluid chamber 521d are blocked.

When the operation air is supplied from the air supply port 522a to the regulator 5 in the valve-closed state, the pressure in the pressure operation chamber 521f communicated with the air supply port 522a increases, so that the diaphragm member 526 elastically deforms the diaphragm part 526a and moves downward in FIG. 21.

The diaphragm member 526 is integrally formed with the diaphragm valve element 524, and thus the diaphragm valve element 524 is moved downward in FIG. 21 against the urging force of the coil spring 514 in association with downward movement of the diaphragm member 526 in FIG. 21. Then, the diaphragm valve element 524 is separated from the valve seat 521e to bring the regulator 5 in the valve-open state. In this state, communication of the fluid between the upstream-side fluid chamber 521c and the downstream-side fluid chamber 521d is allowed. Accordingly, the fluid input in the input passage 521a flows through the upstream-side fluid chamber 521c and the downstream-side fluid chamber 521d and then output from the output passage 521b.

When the pressure in the upstream-side fluid chamber 521c increases, the diaphragm valve element 524 moves upward in FIG. 21 with respect to the valve seat 521e so that the pressure in the downstream-side fluid chamber 521d is maintained constant. On the contrary, when the pressure in the upstream-side fluid chamber 521c decreases, the diaphragm valve element 524 is moved to an opening side with respect to the valve seat 521e so that the pressure in the downstream-side fluid chamber 521d is maintained constant. By this operation and adjustment of the pressure of the operation air that is supplied to the pressure operation chamber 521f, the pressure control of the fluid inside the downstream-side fluid chamber 521d, namely the fluid output from the output passage 521b can be performed.

When supply of the operation air is halted, the diaphragm valve element 524 is moved upward in FIG. 21 by the urging force of the coil spring 514 and the diaphragm valve element 524 comes to contact with the valve seat 521e, the regulator 5 is in the valve-closed state.

Figure 24:
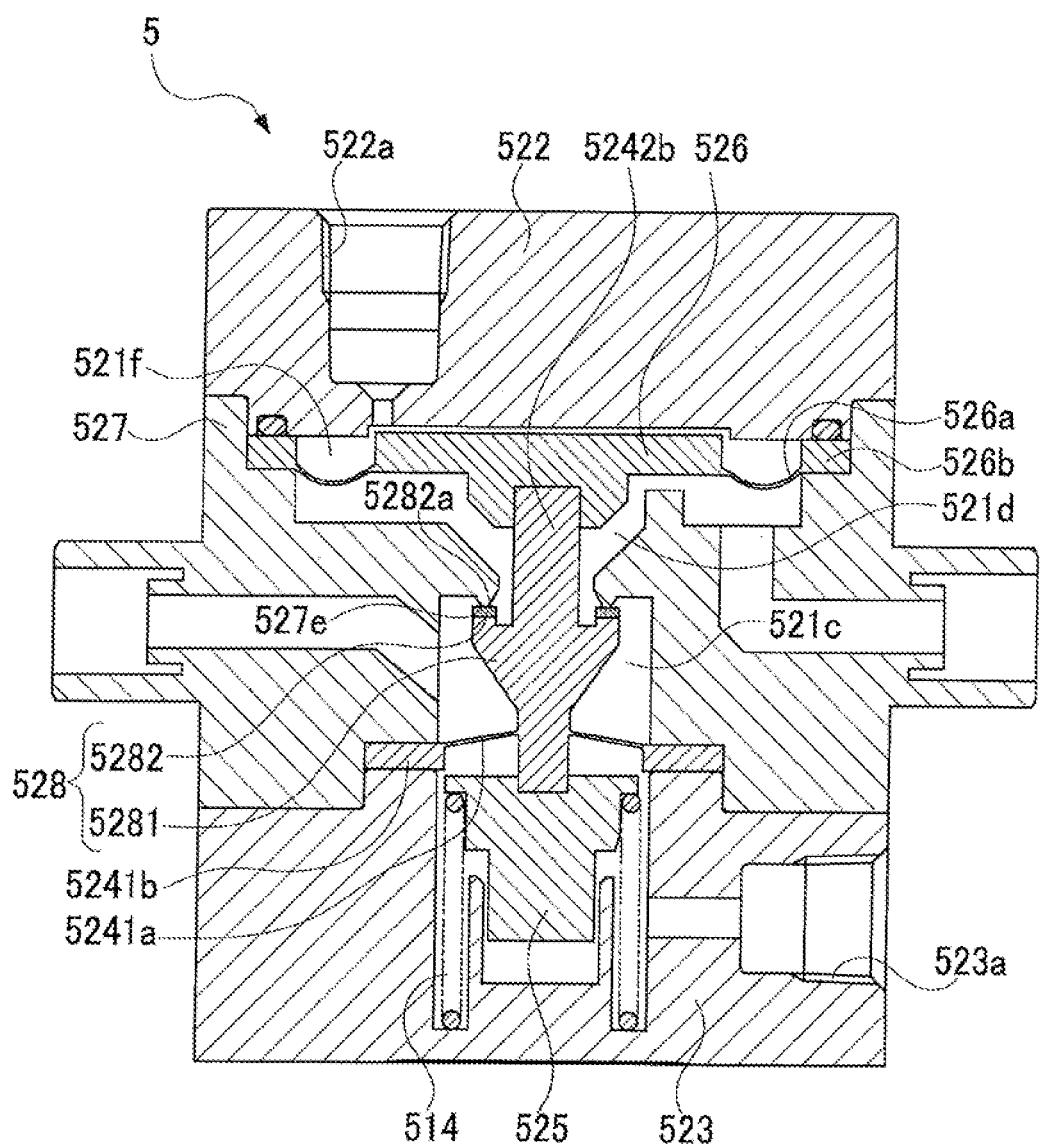
FIG. 24 is a view showing a modified example of a fluid control apparatus (regulator) shown in FIG. 21.

Herein, in the above-mentioned regulator 5, the seat member 5242 configuring the diaphragm valve element 524 is formed to have an annular shape with an almost triangular sectional shape by machining the material joint body 61. Alternatively, the sectional shape may be a rectangular shape like a seat member 5282 of a diaphragm valve element 528 shown in FIG. 24. This diaphragm valve element 528 is also a joint body of a body member 5281 and a seat member 5282. Namely, the diaphragm valve element 528 is formed by machining the material joint body 61 which is formed by welding the body-member material 611 as a compression-molding product of PTFE with high chemical resistance and the seat-member material 612 as an extrusion-molding product or an injection-molding product of PFA. Welding of the body-member material 611 and the seat-member material 612 are performed in a range wider than the contact faces of the body member 5281 and the seat member 5282. Further, an abutment surface 5282a of the seat member 5282 is formed by the molded face as similar with the abutment surface 1222a of the seat member 1222. A valve seat 527e provided in the valve main body 527 to be in and out of contact with the above-mentioned diaphragm valve element 528 is formed to have its angle tapered toward the seat member 5282 on an upper face of the upstream-side fluid chamber 521c in the figure.

As explained above, according to a manufacturing method for a fluid control apparatus of the present embodiment, (1) in a manufacturing method for a fluid control apparatus (for example, the chemical liquid valve 1 and the regulator 5) that controls flow of a fluid by bringing the diaphragm valve element 122 (125, 524, and 528) into or out of contact with the valve seat 121d (124d, 521e, and 527e), the diaphragm valve element 122 (125, 524, and 528) is a joint body of the seat member 1222 (1252, 5242, and 5282) to be in contact with the valve seat 121d (124d, 521e, and 527e) and the body member 1221 (1251, 5241, and 5281), the joint body is formed by machining the material joint body 21 (61) that is formed by welding of the seat-member material 212 (612) as a material for the seat member 1222 (1252, 5242, and 5282) and the body-member material 211 (611) as a material for the body member 1221 (1251, 5241, and 5281), and the welding is performed on contact faces of the seat-member material 212 (612) and the body-member material 211 (611) of the material joint body 21 (61) in a range (the welding range WA11, WA12) wider than the contact faces (the welded portion 32) of the seat member 1222 (1252, 5242, and 5282) and the body member 1221 (1251, 5241, and 5281). Accordingly, the diaphragm valve element 122 (125, 524, and 528) configured by welding of the seat member 1222 (1252, 5242, and 5282) with the body member 1221 (1251, 5241, and 5281) provides no clearance between the seat member 1222 (1252, 5242, and 5282) and the body member 1221 (1251, 5241, and 5281), so that it is possible to prevent generation of residence of the fluid (for example, chemical liquid).

In the present embodiment, the diaphragm valve element 122 (125, 524, and 528) is the joint body of the seat member 1222 (1252, 5242, and 5282) contacted with the valve seat 121d (124d, 521e, and 527e) and the body member 1221 (1251, 5241, and 5281). Further, the joint body is formed by machining the material joint body 21 (61) formed by welding of the seat-member material 212 as the material for the seat member 1222 (1252, 5242, and 5282) and the body-member material 211 as the material for the body member 1221 (1251, 5241, and 5281). This welding of the seat-member material 212 (612) and the body-member material 211 (611) is performed in the range wider than the contact faces of the seat member 1222 (1252, 5242, and 5282) and the body member 1221 (1251, 5241, and 5281). In other words, contact faces of the seat member 1222 (1252, 5242, and 5282) and the body member 1221 (1251, 5241, and 5281) after machining is formed within a range of an area where the seat-member material 212 (612) and the body-member material 211 (611) are welded. Accordingly, the entire contact faces of the seat member 1222 (1252, 5242, and 5282) and the body member 1221 (1251, 5241, and 5281) can be welded. This welding over the entire contact faces of the seat member 1222 (1252, 5242, and 5282) and the body member 1221 (1251, 5241, and 5281) results in no clearance between the seat member 1222 (1252, 5242, and 5282) and the body member 1221 (1251, 5241, and 5281), and thus it is possible to prevent generation of residence of chemical liquid that has been conventionally concerned.

If generation of residence can be prevented, it is possible to prevent possibility of solidification of components of the chemical liquid to become particles. This leads to reduction in possibility of giving a bad influence on the yield of semiconductor manufacturing such as causing defects in the wiring pattern of the semiconductor.

(2) In the manufacturing method for the fluid control apparatus (the chemical liquid valve 1 and the regulator 5) described in the above (1), the seat-member material 212 (612) is formed by any one of the injection molding or the extrusion molding, the seat member 1222 (1252, 5242, and 5282) is provided with the abutment surface 1222a (1252a, 5242a, and 5282a) to be in contact with the valve seat 121d (124d, 521e, and 527e), and the abutment surface 1222a (1252a, 5242a, and 5282a) is formed by a molded face of the seat-member material 212 (612). Accordingly, it is possible to prevent generation of particles due to repetition of contact and separation of the diaphragm valve element 122 (125, 524, and 528) and the valve seat 121d (124d, 521e, and 527e), which could cause coming-off of the seat member 1222 (1252, 5242, and 5282).

For example, when the joint body of the seat member 1222 (1252, 5242, and 5282) and the body member 1221 (1251, 5241, and 5281) is formed by machining, if the abutment surface 1222a (1252a, 5242a, and 5282a) of the seat member 1222 (1252, 5242, and 5282) is formed by machining, the abutment surface 1222a (1252a, 5242a, and 5282a) is remained with trail of cutting blade. This trail of cutting blade results in minute recesses and protrusions on a surface of the abutment surface 1222a (1252a, 5242a, and 5282a), which could make the surface roughness rougher. When the abutment surface 1222a (1252a, 5242a, and 5282a) with rougher surface repeats contact and separation with the valve seat 121d (124d, 521e, and 527e), the above-mentioned minute protrusions come off and that could cause generation of particles.

To address this, as the present invention, configuring the abutment surface 1222a (1252a, 5242a, and 5282a) by a molded face by injection molding or extrusion molding can achieve prevention of the surface roughness from being rougher. Accordingly, even if the abutment surface 1222a (1252a, 5242a, and 5282a) is repeatedly brought into and out of contact with the valve seat 121d (124d, 521e, and 527e), particles are hardly generated. When the seat-member material 212 (612) is formed by injection molding, the surface roughness of the abutment surface 1222a (1252a, 5242a, and 5282a) is influenced by surface roughness of a metal die component and burning occurs on the abutment surface 1222a (1252a, 5242a, and 5282a) due to the gas filled in the metal die, so that it is considered that the surface roughness gets rougher. Therefore, it is the most preferable to form the seat-member material 212 (612) by extrusion molding.

In the manufacturing method for the fluid control apparatus (the chemical liquid valve 1 and the regulator 5) described in the above (1) or (2), the material joint body 21 (61) is formed by a step of overlapping the seat-member material 212 (612) over the body-member material 211 (611), a step of further overlapping an infrared-ray transmissive solid 22 (62) over the seat-member material 212 (612) that has been overlapped with the body-member material 211 (611), and a step of pressing the seat-member material 212 (612) against the body-member material 211 (611) by the infrared-ray transmissive solid 22 (62) and irradiating the infrared beam 25 to the seat-member material 212 (612) and the body-member material 211 (611) to weld the seat-member material 212 (612) and the body-member material 211 (611). Accordingly, the seat-member material 212 (612) and the body-member material 211 (611) are welded by local heating by the infrared beam 25, and thus the body-member material 211 (611) and the seat-member material 212 (612) can be welded in a short time with restraining deterioration in surface property due to thermal damage such as extreme contraction, tear, hideous burning, and thermal decomposition on a surface layer on a side irradiated by the infrared beam 25 to the most.

(4) In the manufacturing method for the fluid control apparatus (the chemical liquid valve 1 and the regulator 5) described in the above (1) or (2), the material joint body 21 (61) is formed by a step of holding the heat plate 31 (63) between the body-member material 211 (611) and the seat-member material 212 (612) to melt faces of the body-member material 211 (611) and the seat-member material 212 (612) where the heat plate 31 (63) is contacted, a step of removing the heat plate 31 (63) from a space between the body-member material 211 (611) and the seat-member material 212 (612), and a step of bringing molten faces of the body-member material 211 (611) and the seat-member material 212 (612) to be in contact and pressurizing and cooling the body-member material 211 (611) and the seat-member material 212 (612) from a vertical direction with respect to the molten faces to weld the body-member material 211 (611) and the seat-member material 212 (612). Accordingly, the welding process becomes easier. For welding by the infrared beam 25, a transmissive material needs to be chosen as a material to be placed on a side where the infrared beam 25 is irradiated so that the material easily passes the infrared beam 25, and an absorbent material needs to be chosen as a material to be placed on an opposite side from the side where the infrared beam 25 is irradiated so that the infrared beam 25 is easily absorbed. However, in a case of welding by use of the heat plate 31, there is no need to consider the transmissibility and absorbability as mentioned above, and thus welding can be performed easily.

Second Embodiment

Next, a second embodiment is explained. In the chemical liquid valve 1 as the fluid control apparatus according to the first embodiment, the diaphragm valve element 122 (125) is configured as the joint body of the body member 1221 (1251) and the seat member 1222 (1252), but as a chemical liquid valve 2 shown in FIG. 10 to FIG. 12, a joint body of a valve main body 126 as a body member and a seat member 127 may be adopted on a side of a valve seat. In the following explanation, only different points from the chemical liquid valve 1 of the first embodiment are explained.

Figure 10:
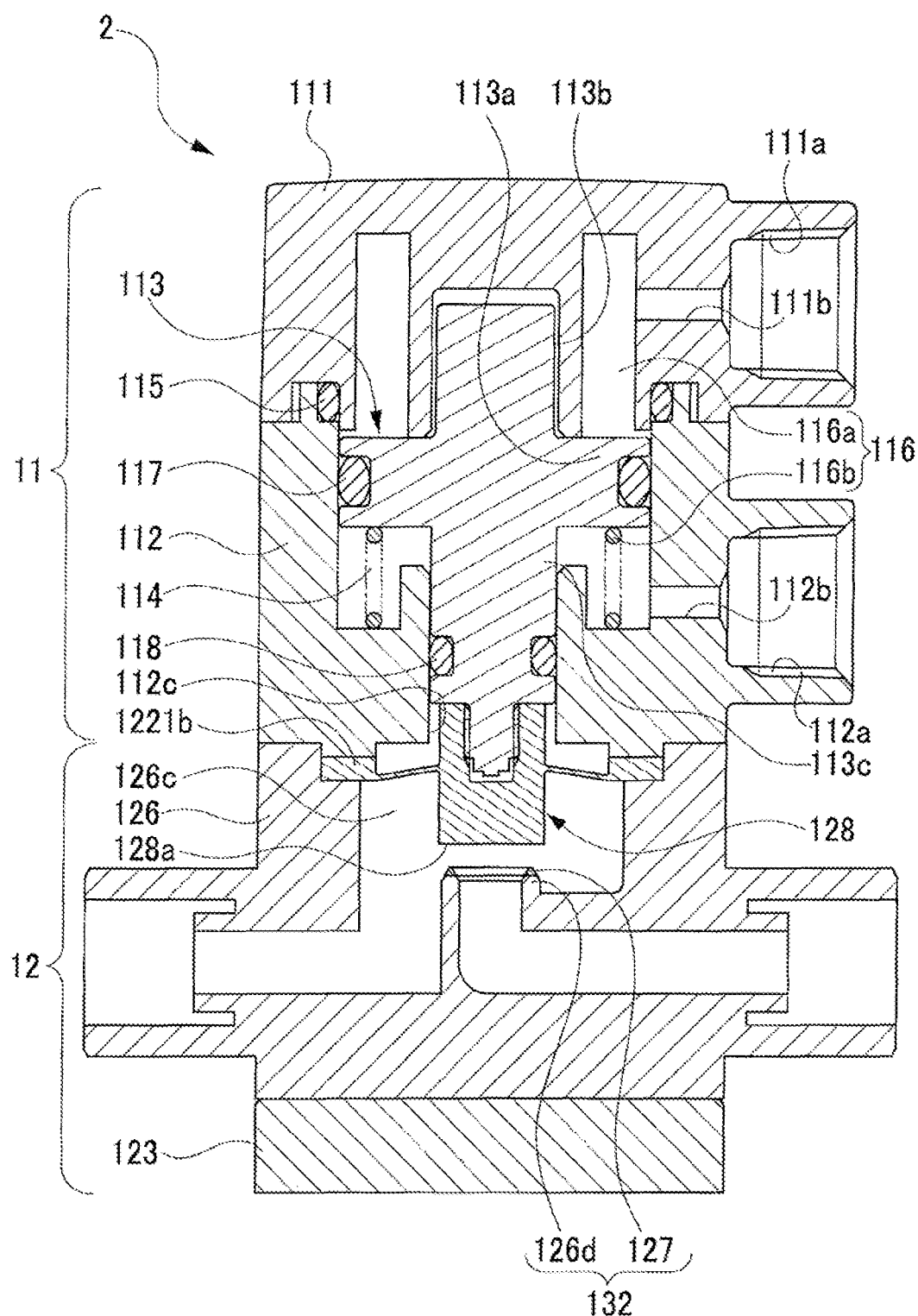
FIG. 10 is a sectional view of the fluid control apparatus in a second embodiment.
Figure 11:
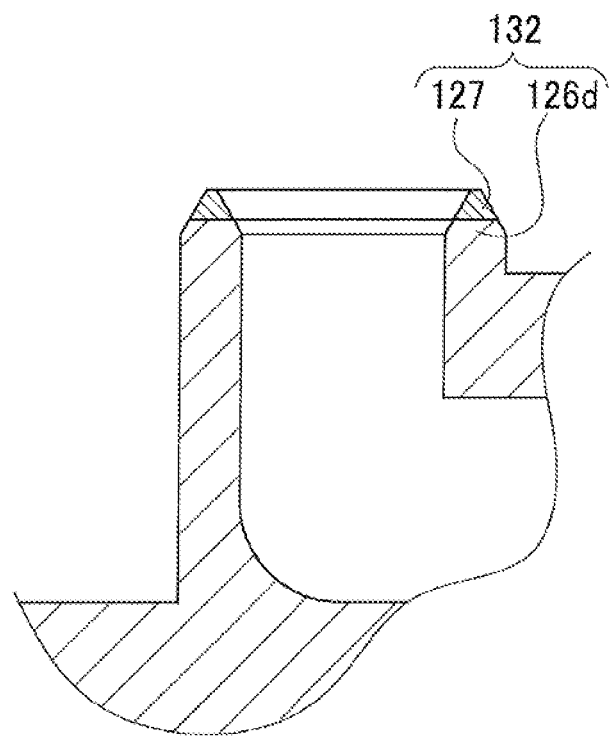
FIG. 11 is a sectional view of a part of a valve seat of the fluid control apparatus in the second embodiment.
Figure 12:
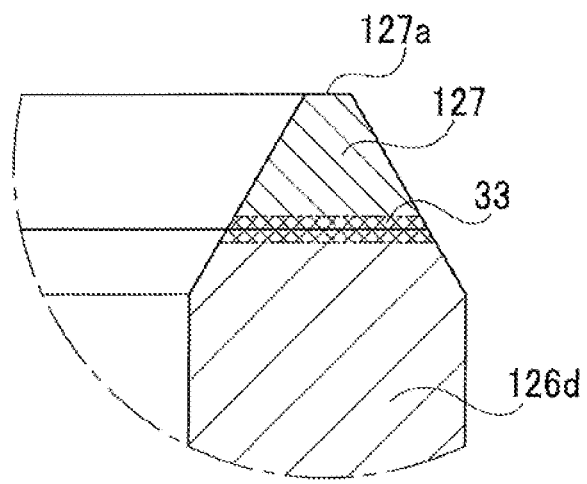
FIG. 12 is an enlarged view of a welded portion of the body member (a valve main body) and the seat member in FIG. 11.

The valve main body 126 is provided in its center on an upper face in FIG. 10 with a valve chamber 126c in a drilled manner, and a protrusion 126d provided on a bottom face of the valve chamber 126c is welded to the seat member 127 to constitute a valve seat 132. Contact faces of the protrusion 126d and the seat member 127 constitute a welded portion 33 as shown in FIG. 12. A face on an opposite side from a welded side of the seat member 127 constitutes an abutment surface 127a to be abutted on a seating surface 128a of a diaphragm valve element 128.

Figure 13:
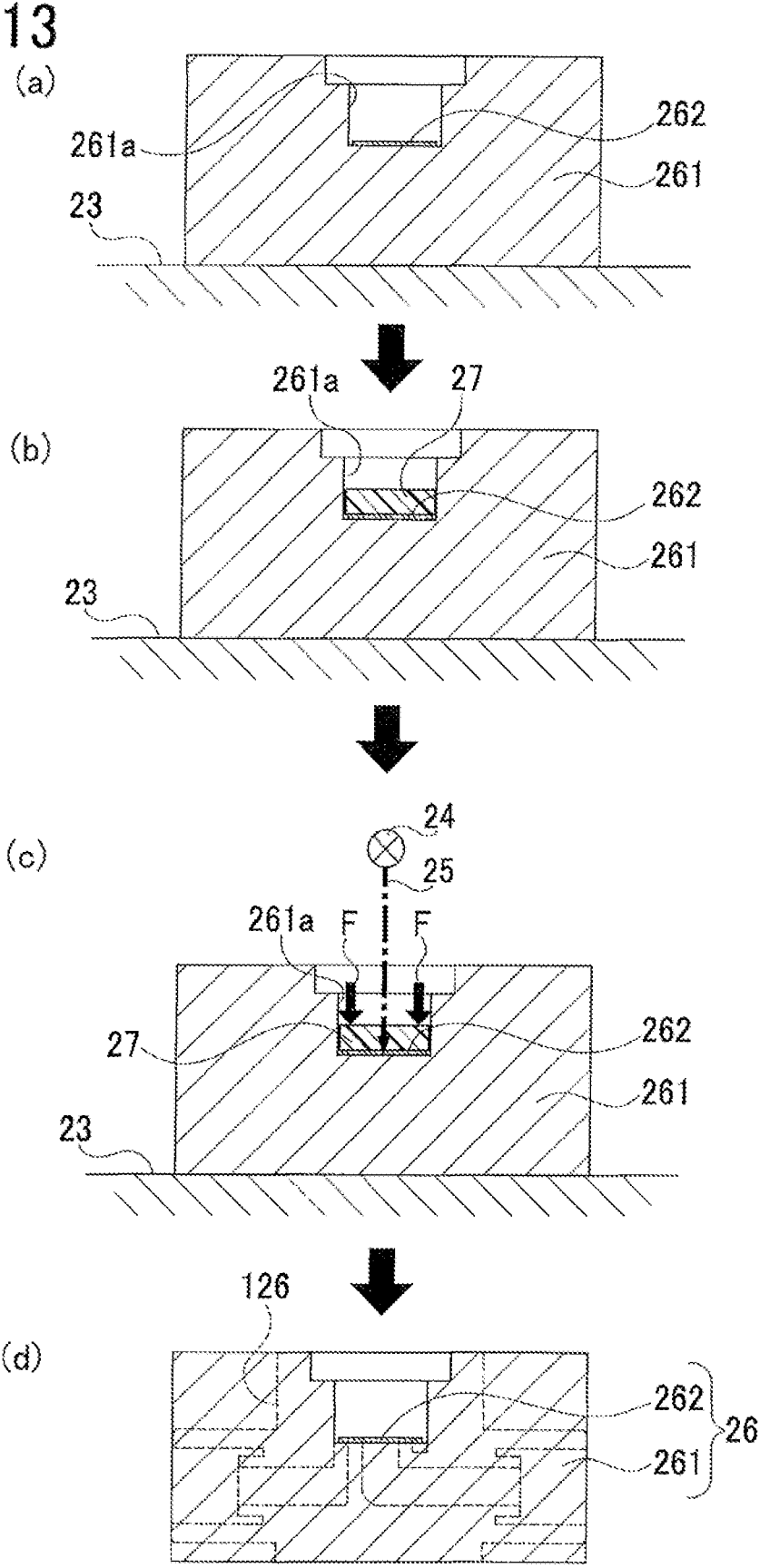
FIG. 13 is an explanatory view explaining a process of manufacturing a joint body of the valve main body and the seat member in the second embodiment by welding by use of the infrared beam through steps of (a) to (d)

The thus configured joint body of the valve main body 126 and the seat member 127 is formed by machining and more specifically, formed as below. Firstly, as shown in FIG. 13 (a), a block-shaped body-member material 261 as a material for the valve main body 126 is placed to be in contact with facing the support member 23. The body-member material 261 is formed with a recessed portion 261a to be constituted as the valve chamber 126c of the valve main body 126. On a bottom face of the recessed portion 261a, a plate-like seat-member material 262 as a material for the seat member 127 is placed to be in contact with the body-member material 261. Herein, the body-member material 261 is, for example, a compression-molding product of PTFE with high chemical resistance. The seat-member material 212 is, for example, an extrusion-molding product of PFA. The seat-member material 262 may be an injection-molding product.

Subsequently, as shown in FIG. 13 (b), on the thus overlapped body-member material 261 and the seat-member material 262, an infrared-ray transmissive solid 27 having heat-sink function is placed to be in contact with the seat-member material 262.

Then, as shown in FIG. 13 (c), the body-member material 261 and the seat-member material 262 are closely contacted by applying a compression force in a direction indicated with the arrows F, and the infrared beam 25 from the light source 24 is irradiated on the body-member material 261 and the seat-member material 262 from a side of the infrared-ray transmissive solid 27. When the infrared beam 25 is irradiated, a temperature at a boundary of the body-member material 261 and the seat-member material 262 becomes the highest. Accordingly, the body-member material 261 and the seat-member material 262 can be welded in a short time while restraining deterioration in surface property due to thermal damage such as extreme contraction, tear, hideous burning, and thermal decomposition on a surface layer on an infrared-ray irradiation side of the seat-member material 262 to the most. By this welding of the body-member material 261 and the seat-member material 262, a material joint body 26 is formed.

Finally, as shown in FIG. 13 (d), the material joint body 26 is machined to be in a shape as indicated with a broken line, and thus the joint body of the valve main body 126 and the seat member 127 is formed.

Herein, the abutment surface 127a of the seat member 127 to be abutted on the seating surface 128a of the diaphragm valve element 128 is not formed by machining but formed to be kept as a molded face of the seat-member material 262.

For example, if the abutment surface 127a is to be formed by machining, trail of cutting blade remains on the abutment surface 127a. This trail of cutting blade creates minute recesses and protrusions on a surface of the abutment surface 127a, which could make a surface roughness rougher. When the abutment surface 127a with the rougher surface repeats operation of contact and separation with the diaphragm valve element 128, the above-mentioned minute protrusions could come off to result in particles.

To address this, the present embodiment is configured such that the abutment surface 127a is formed by the molded face by the extrusion molding in order to prevent the surface roughness from becoming rougher. Therefore, even when the abutment surface 127a repeats contact and separation with the diaphragm valve element 128, particles are hardly generated.

When the material joint body 26 is to be formed by the body-member material 261 and the seat-member material 262, the welding by the infrared beam 25 is performed in a range wider than a contact area of the valve main body 126 and the seat member 127 which constitute the joint body formed by machining. By this welding, a welded portion 33 is formed over the entire contact faces of the valve main body 126 and the seat member 127 as shown in FIG. 12. Accordingly, there is no clearance created between the valve main body 126 and the seat member 127 after machining. No clearance created between the valve main body 126 and the seat member 127 makes it possible to prevent generation of residence which has been conventionally concerned. If generation of residence can be prevented, it is possible to prevent the resided chemical liquid from being degraded and to prevent components of the chemical liquid from becoming particles, thereby reducing the possibility of defects in the wiring pattern of the semiconductor.

Figure 14:
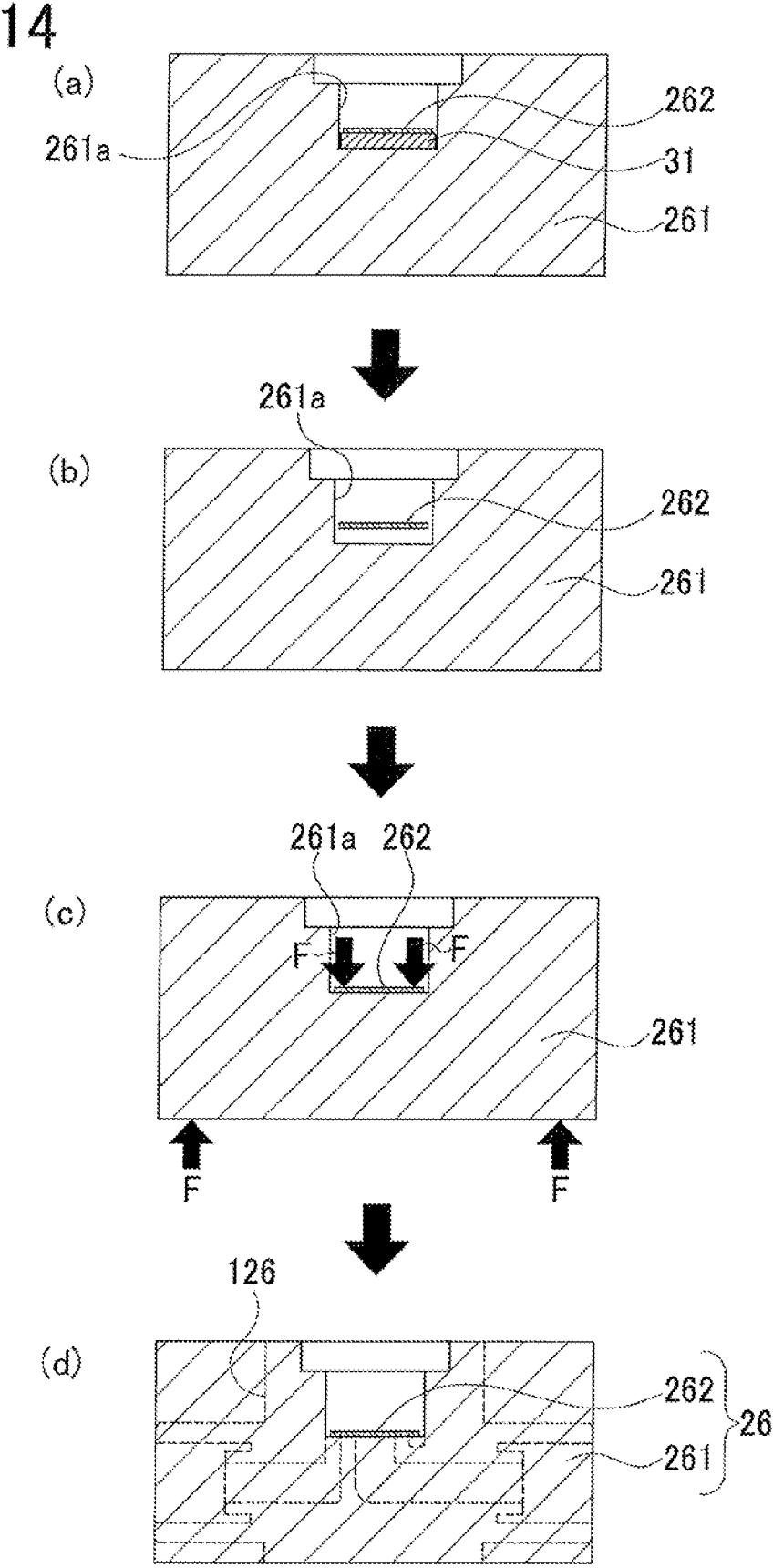
FIG. 14 is an explanatory view explaining a process of manufacturing the joint body of the valve main body and the seat member in the second embodiment by heat-plate welding through steps of (a) to (d)

Other than welding by the above-mentioned infrared beam 25, the joint body of the valve main body 126 and the seat member 127 may be formed by heat-plate welding which will be explained below. As shown in FIG. 14 (a), a bottom surface of the recessed portion 261a of the body-member material 261 and the seat-member material 262 are placed with a heat plate 31 held therebetween. Then, the bottom surface of the recessed portion 261a and the seat-member material 262 are each contacted with the heat plate 31. In this manner, the respective end faces of the bottom surface of the recessed portion 261a and the seat-member material 262, which are in contact with the heat plate 31, are molten.

Subsequently, after the heat plate 31 has been removed as shown in FIG. 14 (b), the molten faces of the body-member material 261 and the seat-member material 262 are brought into contact with each other as shown in FIG. 14 (c). Then, the body-member material 261 and the seat-member material 262 are compressed in a vertical direction (the arrows F) with respect to the molten faces of the body-member material 261 and the seat-member material 262 and cooled down. As a result of this, the body-member material 261 and the seat-member material 262 are welded to form the material joint body 26.

Thereafter, as shown in FIG. 14 (d), the material joint body 26 is machined to be in a shape indicated with a broken line so that the joint body of the valve main body 126 and the seat member 127 is formed.

According to the above-mentioned heat-plate welding, the entire contact faces of the body-member material 261 and the seat-member material 262 are welded. Accordingly, a welding range is wider than an area of the welded portion 33 as the contact faces of the valve main body 126 and the seat member 127 of the joint body of the valve main body 126 and the seat member 127 which is formed by machining. Therefore, the welded portion 33 is formed over the entire contact faces of the valve main body 126 and the seat member 127 as shown in FIG. 12. Thus, there is no clearance between the valve main body 126 and the seat member 127. No clearance between the valve main body 126 and the seat member 127 makes it possible to prevent generation of residence which has been conventionally concerned. If generation of residence can be prevented, it is possible to prevent the resided chemical liquid from being degraded and to prevent components of the chemical liquid from becoming particles, thereby reducing the possibility of defects in the wiring pattern of the semiconductor.

Figure 15:
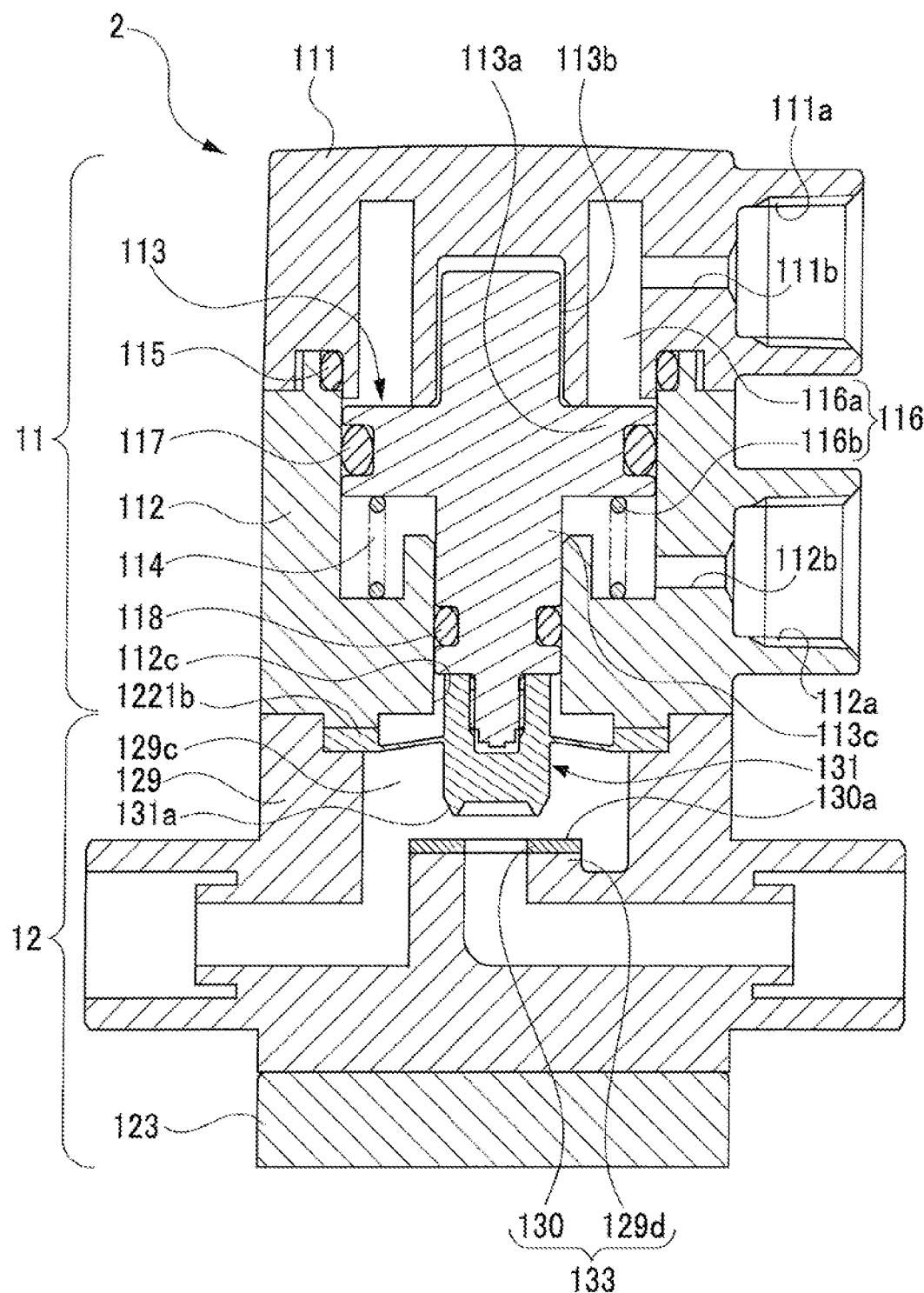
FIG. 15 is a view of a modified example of the fluid control apparatus in the second embodiment.
Figure 16:
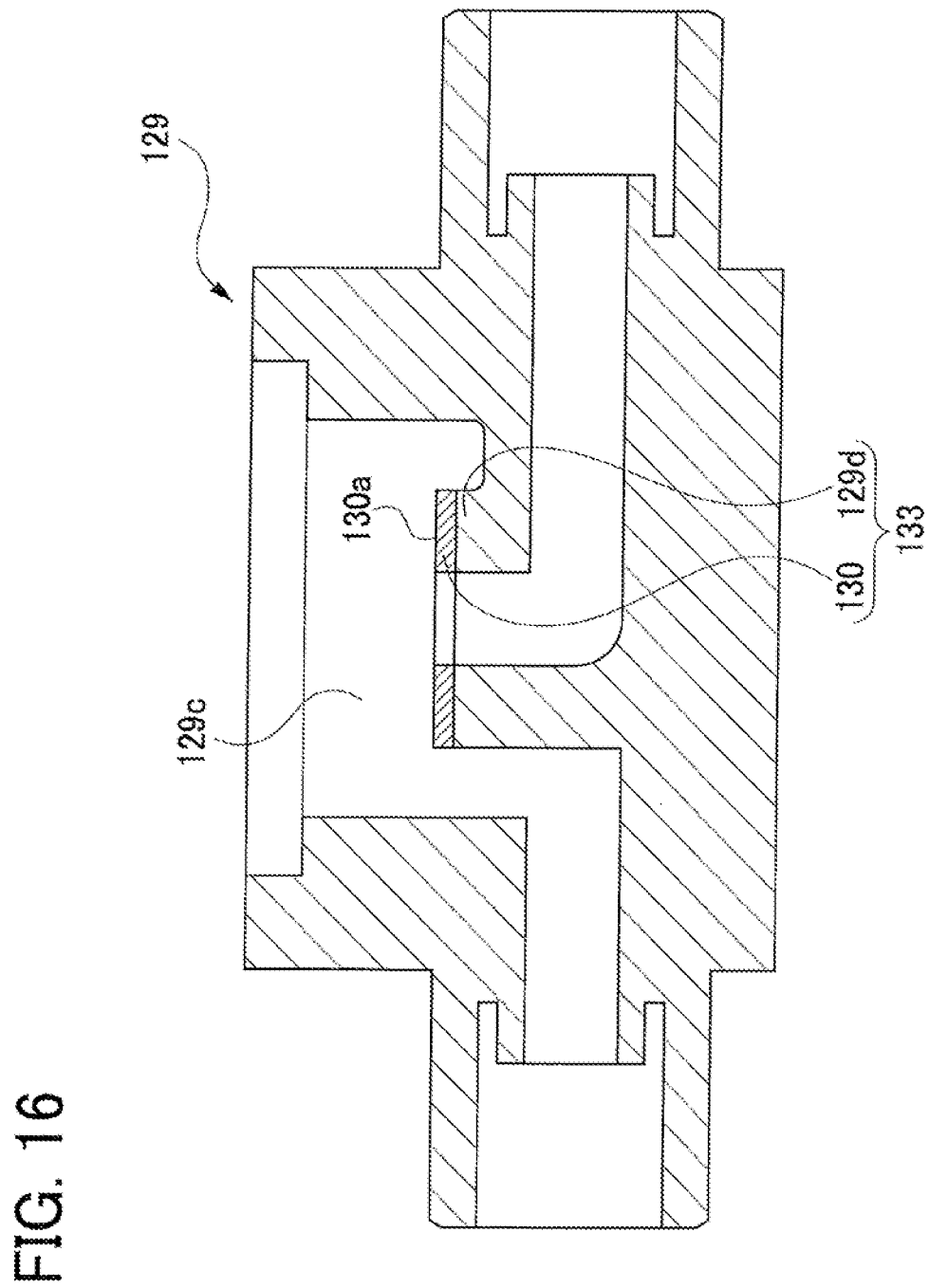
FIG. 16 is an enlarged view of the joint body of the valve main body and the seat member in FIG. 15.
Figure 17:
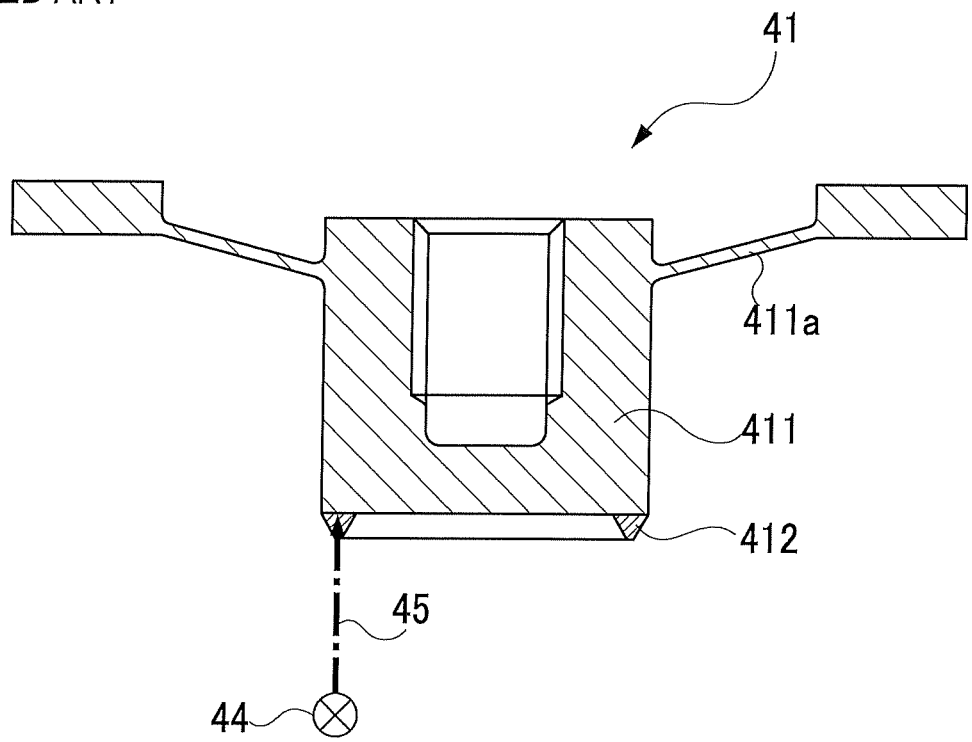
FIG. 17 is an explanatory view explaining the diaphragm valve element in a conventional art.
Figure 18:
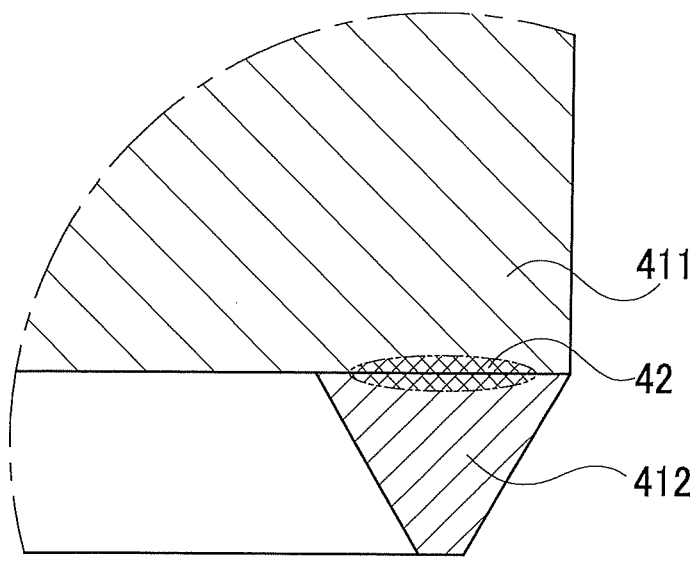
FIG. 18 is an enlarged view of the welded portion of the body member and the seat member in FIG. 17.
Figure 19:
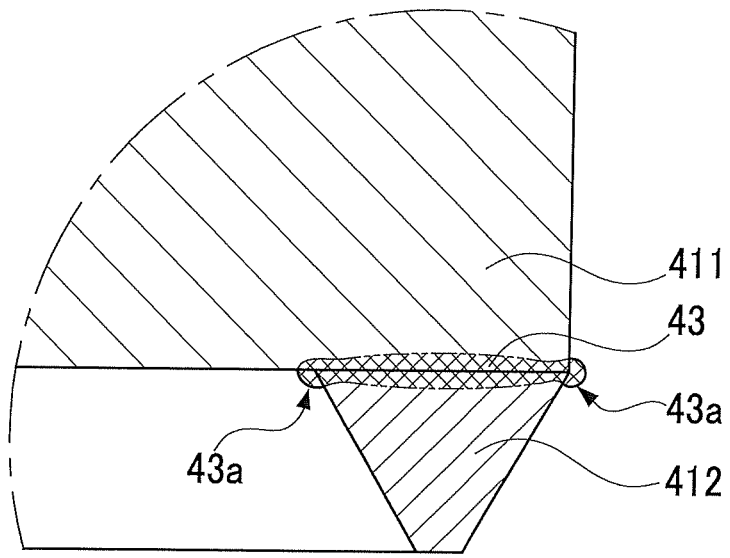
FIG. 19 is an explanatory view explaining the diaphragm valve element in the conventional art.
Figure 20:
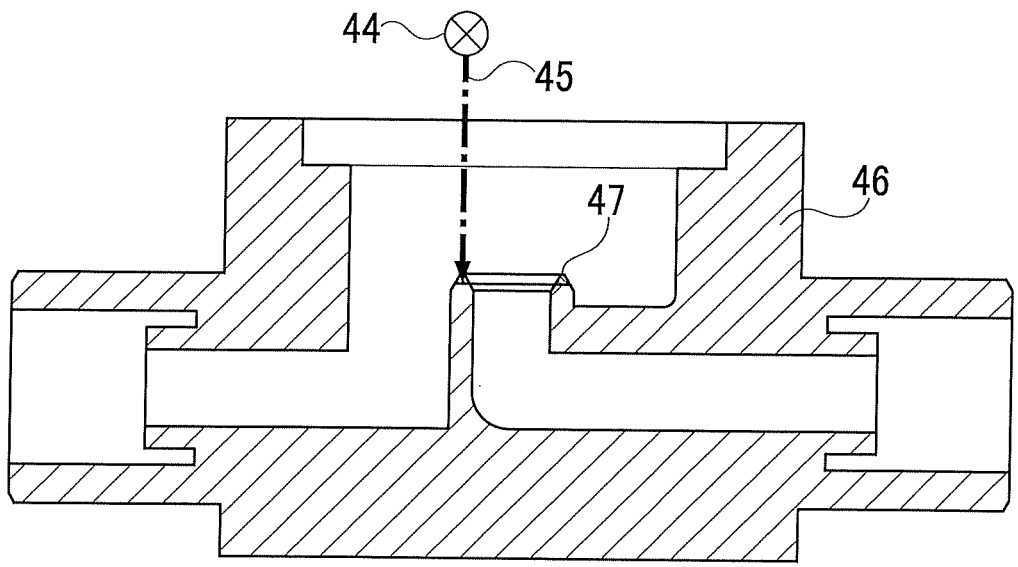
FIG. 20 is an explanatory view explaining the valve main body in the conventional art.

In the above-mentioned second embodiment, the seat member 127 is formed by machining the material joint body 26 to be in an annular shape with an almost triangular sectional shape, but the sectional shape may be rectangular like a seat member 130 shown in FIG. 15 and FIG. 16. In this case, a valve main body 129 is provided with a valve chamber 129c in a drilled manner in a center of its upper end face in FIG. 15, and the seat member 130 is welded to a protrusion 129d provided on a bottom surface of the valve chamber 129c to form the valve seat 133. A joint body of this valve main body 129 and the seat member 130 is also formed by machining the material joint body 26 formed by welding the body-member material 261 as the compression-molding product of PTFE with high chemical resistance and the seat-member material 262 as the extrusion-molding product of PFA. This welding is performed in a range wider than a contact area of the valve main body 129 and the seat member 130. Further, an abutment surface 130a of the seat member 130 is formed by the molded face as similar with the abutment surface 127a of the seat member 127. A diaphragm valve element 131 to be in and out of contact with the thus formed valve seat 133 is provided with a seating portion 131a formed to protrude on a lower end face in FIG. 15 in a protrusion-like manner.

Figure 25:
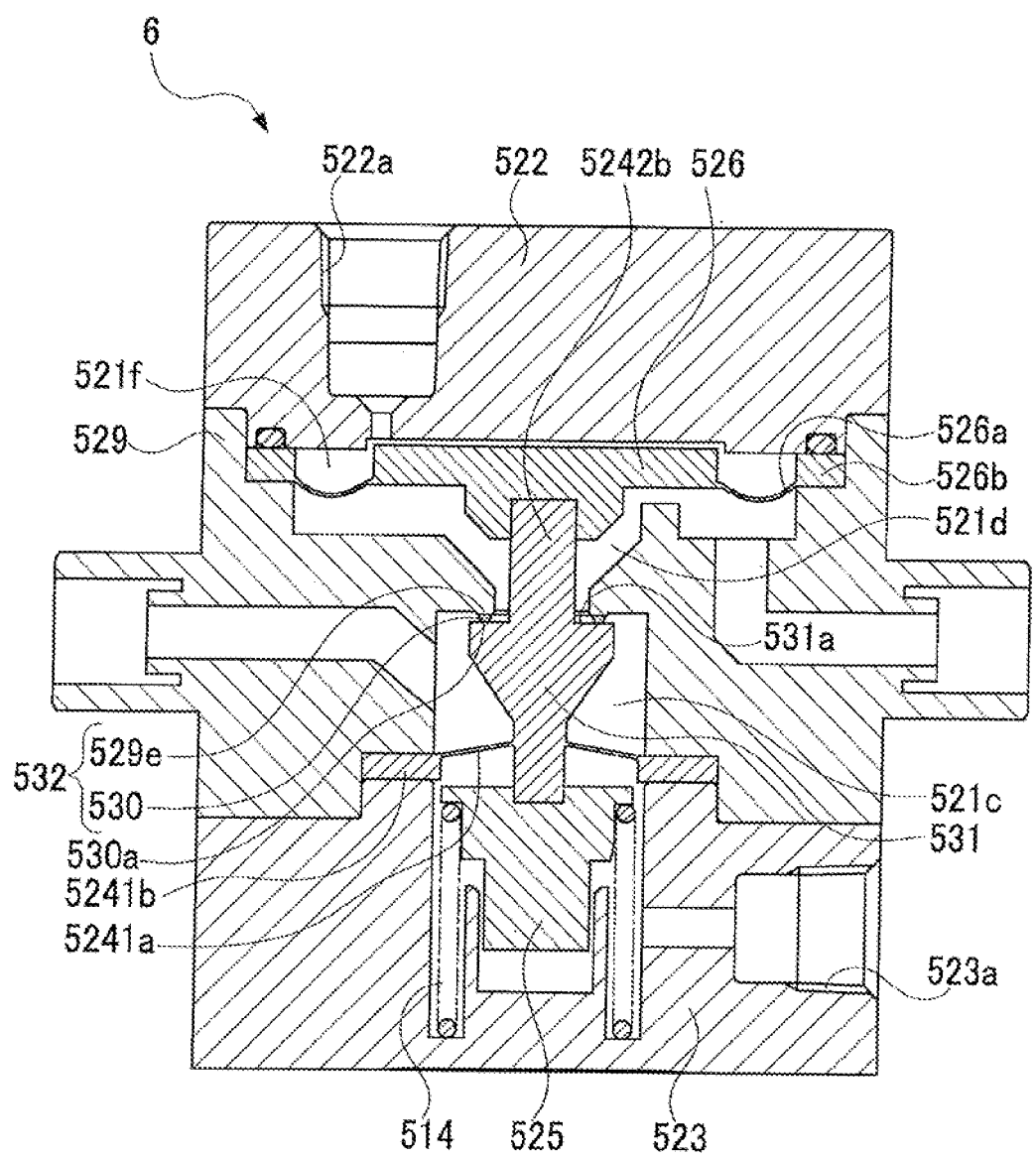
FIG. 25 is a view showing a modified example of the fluid control apparatus in the second embodiment.

The chemical liquid valve 2 performing the flow rate control has been explained above as a fluid control apparatus, but for example, a regulator 6 performing pressure control may also adopt a joint body of a valve main body 529 as a body member and a seat member 530 on a side of a valve seat as shown in FIG. 25.

The valve main body 529 is provided with an upstream-side fluid chamber 521c in a drilled manner in a center of its lower end face in FIG. 25, and a valve seat 532 is formed by welding the seat member 530 to a protrusion 529e which is provided on an upper face of the upstream-side fluid chamber 521c. Contact faces of the protrusion 529e and the seat member 530 constitute a welded portion. This welded portion is formed over the entire contact faces of the protrusion 529e and the seat member 530 as similar with the welded portion 33 shown in FIG. 12. The seat member 530 includes an abutment surface 530a to be abutted on a seating surface 531a of a diaphragm valve element 531 on a side opposite to a welded side. The abutment surface 530a is, as similar with the seat member 127 which is used for the above-mentioned chemical liquid valve 2, formed by a molded face of a seat-member material 712 (see FIG. 26) as a material for the seat member 530 to prevent generation of particles.

Figure 26:
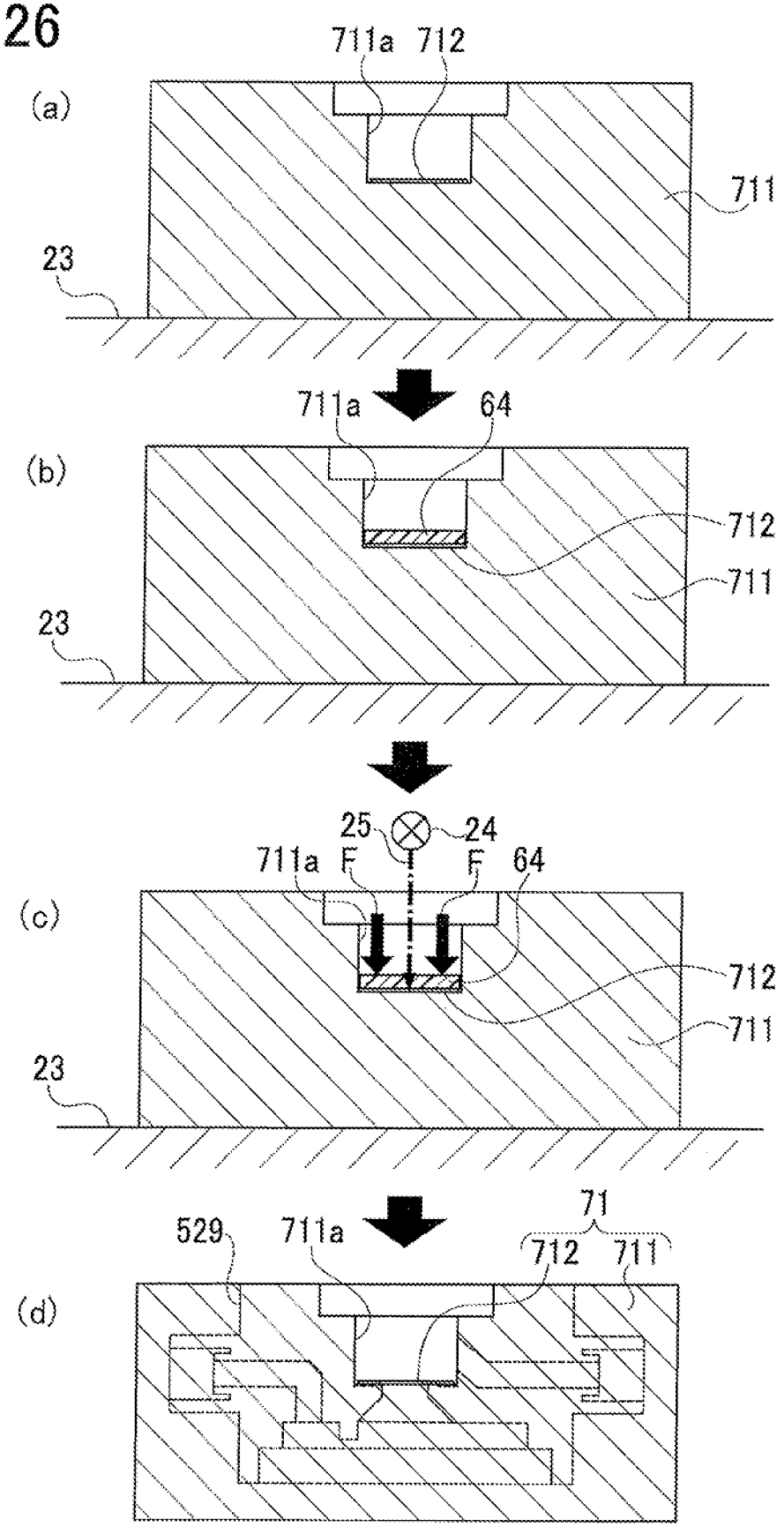
FIG. 26 is an explanatory view explaining a process of manufacturing the joint body of the valve main body and the seat member shown in FIG. 25 by welding by use of the infrared beam through steps of (a) to (d)

The above-mentioned joint body of the valve main body 529 and the seat member 530 is formed by machining, and more specifically, formed as explained below. Firstly, as shown in FIG. 26 (a), a block-shaped body-member material 711 as a material for the valve main body 529 is placed to be in contact with facing the support member 23. The body-member material 711 includes a recessed portion 711a to be constituted as the upstream-side fluid chamber 521c of the valve main body 529. On a bottom surface of the recessed portion 71a, a plate-like seat-member material 712 as a material for the seat member 530 is placed to be in contact with the body-member material 711. Herein, the body-member material 711 is, for example, a compression-molding product of PTFE with high chemical resistance. The seat-member material 712 is, for example, an extrusion-molding product or an injection-molding product of PFA.

Subsequently, as shown in FIG. 26 (b), the infrared-ray transmissive solid 64 is placed to be in contact with the seat-member material 712 on a side opposite to the support member 23 with respect to the overlapped body-member material 711 and the seat-member material 712.

Then, as shown in FIG. 26 (c), the body-member material 711 and the seat-member material 712 are closely contacted by applying a compression force in a direction indicated with the arrows F, and the infrared beam 25 from the light source 24 is irradiated on the body-member material 711 and the seat-member material 712 from a side of the infrared-ray transmissive solid 64. A material joint body 71 is thus formed by irradiating the infrared beam 25 to weld the body-member material 711 and the seat-member material 712. Welding by the infrared beam 25 is performed in a rage wider than contact faces of the valve main body 529 and the seat member 530 of the joint body of the valve main body 529 and the seat member 530 which is formed by machining. This is similar with the valve main bodies 126 and 129 which are used for the above-identified chemical liquid valve 2. Accordingly, the entire contact faces of the valve body member 529 and the seat member 530 become the welded portion, and thus there is no clearance created between the valve main body 529 and the seat member 530, thereby preventing generation of residence of fluid (for example, chemical liquid).

Finally, as shown in FIG. 26 (d), the material joint body 71 is machined to be in a shape as indicated with a broken line, and thus the joint body of the valve main body 529 and the seat member 530 is formed.

Other than welding by the above-mentioned infrared beam 25, the joint body of the valve main body 529 and the seat member 530 may be formed by heat-plate welding. A process of the heat-plate welding is similar to the process indicated in FIG. 14.

A bottom surface of the recessed portion 711a of the body-member material 711 and the seat-member material 712 are placed with a heat plate held therebetween so that the end faces of the bottom surface of the recessed portion 711a and the seat-member material 712, which are in contact with the heat plate, are molten. Then, the heat plate is removed to bring the molten faces of the body-member material 711 and the seat-member material 712 into close contact with each other. The body-member material 711 and the seat-member material 712 are compressed in a vertical direction with respect to the molten faces of the body-member material 711 and the seat-member material 712 and cooled down. In this manner, the body-member material 711 and the seat-member material 712 are welded to form the material joint body 71. Thereafter, the material joint body 71 is machined to form the joint body of the valve main body 529 and the seat member 530.

By the heat-plate welding, there is no clearance created between the valve main body 529 and the seat member 530, and thus it is possible to prevent generation of residence which has been conventionally concerned. This point is similar with the valve seats 132 and 133 of the above-mentioned chemical liquid valve 2.

Figure 27:
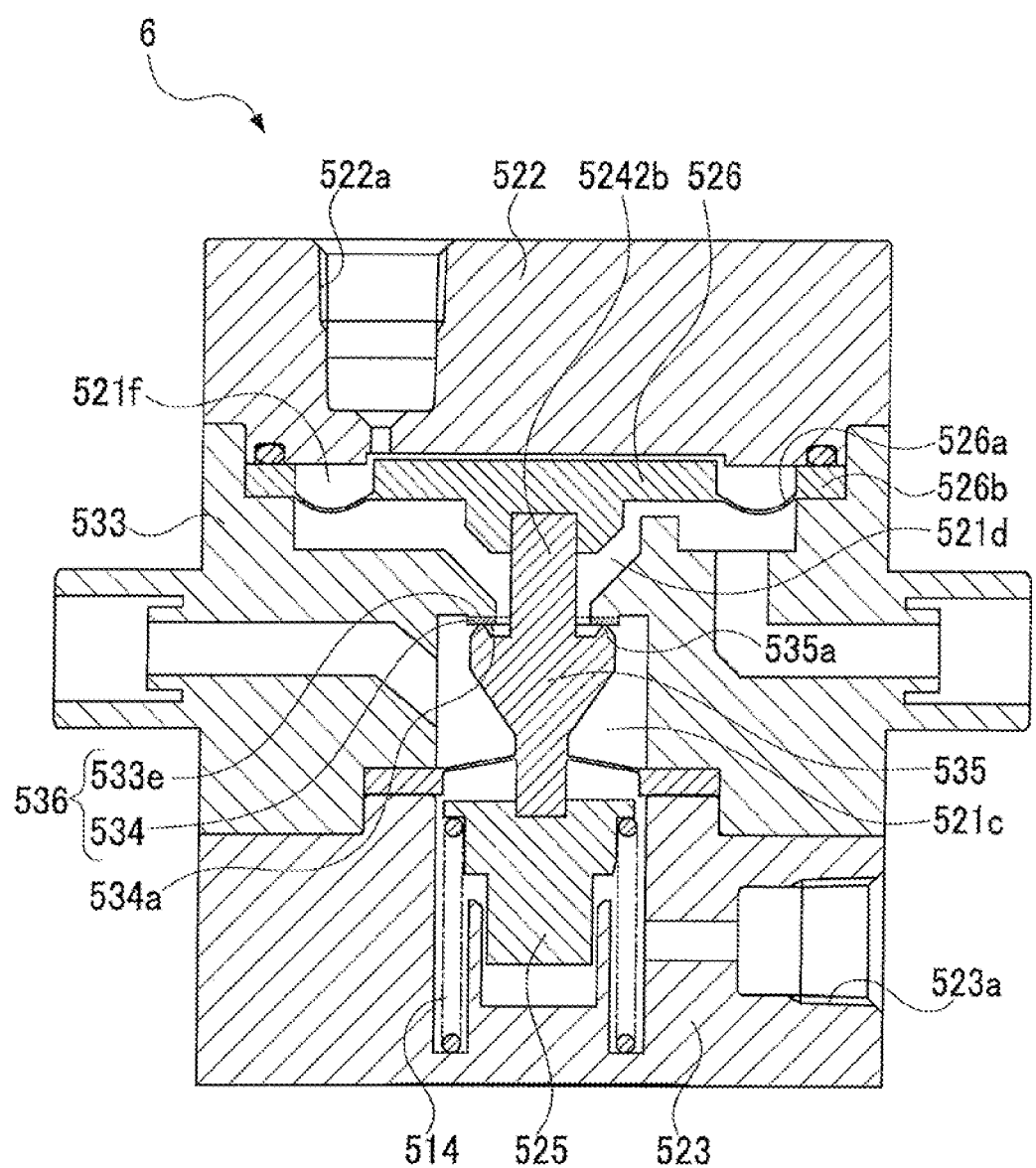
FIG. 27 is a view showing a modified example of the fluid control apparatus (regulator) shown in FIG. 25.

In the above-mentioned regulator 6, the seat member 530 is formed by machining the material joint body 71 to be in an annular shape with an almost triangular sectional shape, but the sectional shape may be rectangular like a seat member 534 shown in FIG. 27. In this case, a valve main body 533 is provided with the upstream-side fluid chamber 521c in a drilled manner in a center of its lower end face in FIG. 27, and the seat member 534 is welded to a protrusion 533e provided on a bottom surface of the upstream-side fluid chamber 521c to form a valve seat 536. A joint body of this valve main body 533 and the seat member 534 is also formed by machining the material joint body 71 formed by welding the body-member material 711 as a compression-molding product of PTFE with high chemical resistance and the seat-member material 712 as an extrusion-molding product or an injection-molding product of PFA. This welding is performed in a range wider than a contact area of the valve main body 533 and the seat member 534. Further, an abutment surface 534*a* of the seat member 534 is formed by a molded face as similar with the abutment surface 530*a* of the seat member 530. A diaphragm valve element 535 to be in and out of contact with the thus formed valve seat 536 is provided with a seating portion 535*a* formed to protrude in a protrusion-like manner as shown in FIG. 27.

As explained above, according to a manufacturing method of the fluid control apparatus (the chemical liquid valve 2 and the regulator 6) of the second embodiment, (1) in a manufacturing method for a fluid control apparatus (for example, the chemical liquid valve 2 and the regulator 6) that controls flow of a fluid by bringing the diaphragm valve element 128 (131, 531, and 535) into or out of contact with the valve seat 132 (133, 532, and 536), the valve seat 132 (133, 532, and 536) is a joint body of the seat member 127 (130, 530, and 534) to be in contact with the diaphragm valve element 128 (131, 531, and 535) and the valve main body 126 (129, 529, and 533) as a body member, the joint body is formed by machining the material joint body 26 (71) that is formed by welding of the seat-member material 262 (712) as the material for the seat member 127 (130, 530, and 534) and the body-member material 261 (711) as the material for the valve main body 126 (129, 529, and 533), and the welding is performed on contact faces of the seat-member material 262 (712) and the body-member material 261 (711) in a range wider than the contact faces of the seat member 127 (130, 530, and 534) and the valve main body 126 (129, 529, and 533) of the joint body. Accordingly, the valve seat 132 (133, 532, and 536) configured by welding of the seat member 127 (130, 530, and 534) and the valve main body 126 (129, 529, and 533) provides no clearance between the seat member 127 (130, 530, and 534) and the valve main body 126 (129, 529, and 533), so that it is possible to prevent generation of residence of the fluid (for example, chemical liquid).

In the present embodiment, the valve seat 132 (133, 532, and 536) is the joint body of the seat member 127 (130, 530, and 534) to be contacted with the diaphragm valve element 128 (131, 531, and 535) and the valve main body 126 (129, 529, and 533). Further, the joint body is formed by machining the material joint body 26 (71) formed by welding of the seat-member material 262 (712) as the material for the seat member 127 (130, 530, and 534) and the body-member material 261 (711) as the material for the valve main body 126 (129, 529, and 533). The welding of the seat-member material 262 (712) and the body-member material 261 (711) is performed in the range wider than the contact faces of the seat member 127 (130, 530, and 534) and the valve main body 126 (129, 529, and 533). In other words, contact faces of the seat member 127 (130, 530, and 534) and the valve main body 126 (129, 529, and 533) after machining is formed within a range of an area where the seat-member material 262 (712) and the body-member material 261 (711) are welded. Accordingly, the entire contact faces of the seat member 127 (130, 530, and 534) and the valve main body 126 (129, 529, and 533) can be welded. The welding of the entire contact faces of the seat member 127 (130, 530, and 534) and the valve main body 126 (129, 529, and 533) creates no clearance between the seat member 127 (130, 530, and 534) and the valve main body 126 (129, 529, and 533), so that it is possible to prevent generation of the chemical liquid that has been conventionally concerned. If generation of residence can be prevented, it is possible to prevent possibility of solidification of components of the chemical liquid to result in particles. This leads to reduction in possibility of giving a bad influence on the yield of semiconductor manufacturing such as causing defects in the wiring pattern of the semiconductor.

(2) In the manufacturing method for the fluid control apparatus (the chemical liquid valve 2 and the regulator 6) described in the above (1), the seat-member material 262 (712) is formed by any one of injection molding or extrusion molding, the seat member 127 (130, 530, and 534) is provided with the abutment surface 127*a* (130*a*, 530*a*, and 534*a*) to be in contact with the diaphragm valve element 128 (131, 531, and 535), and the abutment surface 127*a* (130*a*, 530*a*, and 534*a*) is formed by the molded face of the seat-member material 262 (712). Accordingly, it is possible to prevent generation of particles due to repetition of contact and separation of the diaphragm valve element 128 (131, 531, and 535) and the valve seat 132 (133, 532, and 536) which could cause coming-off of the seat member 127 (130, 530, and 534).

For example, when the joint body of the seat member 127 (130, 530, and 534) and the valve main body 126 (129, 529, and 533) is formed by machining, if the abutment surface 127*a* (130*a*, 530*a*, and 534*a*) of the seat member 127 (130, 530, and 534) is formed by machining, the abutment surface 127*a* (130*a*, 530*a*, and 534*a*) is remained with trails of cutting blade. This trail of cutting blade results in minute recesses and protrusions on a surface of the abutment surface 127*a* (130*a*, 530*a*, and 534*a*), which could make the surface roughness rougher. When the abutment surface 127*a* (130*a*, 530*a*, and 534*a*) with rougher surface repeats contact and separation with the diaphragm valve element 128 (131, 531, and 535), the above-mentioned minute protrusions could come off to cause generation of particles.

To address this, as the present invention, configuring the abutment surface 127*a* (130*a*, 530*a*, and 534*a*) by a molded face by injection molding or extrusion molding can prevent the surface roughness from being rougher. Accordingly, even if the abutment surface 127*a* (130*a*, 530*a*, and 534*a*) is repeatedly brought into and out of contact with the diaphragm valve element 128 (131, 431, and 535), particles are hardly generated. When the seat-member material 262 (712) is formed by injection molding, the surface roughness of the abutment surface 127*a* (130*a*, 530*a*, and 534*a*) is influenced by surface roughness of the metal die component and burning occurs on the abutment surface 127*a* (130*a*, 530*a*, and 534*a*) due to the gas filled in the metal die, so that it is considered that the surface roughness gets rougher. Therefore, it is the most preferable to form the seat-member material 262 (712) by extrusion molding.

(3) In the manufacturing method for the fluid control apparatus (the chemical liquid valve 2 and the regulator 6) described in the above (1) or (2), the material joint body 26 (71) is formed by a step of overlapping the seat-member material 262 (712) over the body-member material 261 (711), a step of further overlapping the infrared-ray transmissive solid 27 (64) over the seat-member material 262 (712) that has been placed on the body-member material 261 (711), and a step of pressing the seat-member material 262 (712) against the body-member material 261 (711) by the infrared-ray transmissive solid 27 (64) and irradiating the infrared beam 25 to the seat-member material 262 (712) and the body-member material 261 (711) from a side of the infrared-ray transmissive solid 27 (64) to weld the seat-member material 262 (712) and the body-member material 261 (711). Accordingly, the seat-member material 262 (712) and the body-member material 261 (711) are welded by local heating by the infrared beam 25, and thus the body-member material 261 (711) and the seat-member material 262 (712) can be welded in a short time with restraining deterioration in surface property due to thermal damage such as extreme contraction, tear, hideous burning, and thermal decomposition on a surface on side irradiated by the infrared beam 25 to the most.

(4) In the manufacturing method for the fluid control apparatus (the chemical liquid valve 2 and the regulator 6) described in the above (1) or (2), the material joint body 26 (71) is formed by a step of holding the heat plate 31 between the body-member material 261 (711) and the seat-member material 262 (712) to melt faces of the body-member material 261 (711) and the seat-member material 262 (712) where the heat plate is contacted, a step of removing the heat plate 31 from a space between the body-member material 261 (711) and the seat-member material 262 (712), and a step of bringing molten faces of the body-member material 261 (711) and the seat-member material 262 (712) to be in contact and pressurizing and cooling the body-member material 261 (711) and the seat-member material 262 (712) from a vertical direction with respect to the molten faces to weld the body-member material 261 (711) and the seat-member material 262 (712). Accordingly, the welding process is made further easily. For welding by the infrared beam 25, a material to be placed on a side, on which the infrared beam 25 is irradiated, needs to be selected from materials having transmissibility so that the infrared beam 25 is easily transmitted, and a material to be placed on an opposite side from the side where the infrared beam 25 is irradiated needs to be selected from materials having absorbability so that the infrared beam 25 is easily absorbed. However, welding by use of the heat plate 31 has no need to consider the above-mentioned transmissibility and absorbability, and welding can be made easily.

The first embodiment and the second embodiment mentioned above are only illustration, and have no limitation to the present invention. Accordingly, the present invention may naturally be made with various improvements and modifications without departing from the scope of the invention. For example, the fluid control apparatus is illustrated as the chemical liquid valves 1 and 2 and the regulators 5 and 6 which are used for the semiconductor manufacturing process, but the apparatus is not limited to these and may be applied to various fluid control apparatuses such as a chemical liquid valve used for a medical analyzing apparatus.

Further, PFA is adopted as the seat-member material 212, 262, 612, and 712, but the material is not limited to this and may be any other thermal plastic resin. Furthermore, PTFE is adopted as the body-member material 211, 261, 611, and 711, but the material is not limited to this and may be denatured PTFE or PFA. There have been exemplified manufacturing the material joint body 21, 26, 61, and 71 by welding with the infrared beam 25 or heat-plate welding, but alternatively, the material joint body 21, 26, 61, and 71 may be manufactured by an infrared heater, oscillation welding and ultrasonic welding.

REFERENCE SIGNS LIST

1 Chemical liquid valve (one example of a fluid control apparatus)
21 Material joint body
121*d* Valve seat
122 Diaphragm valve element (one example of a valve element)
211 Body-member material
212 Seat-member material
1221 Body member
1222 Seat member

The invention claimed is:

1. A manufacturing method for a fluid control apparatus that controls flow of a fluid by bringing a valve element into or out of contact with a valve seat, wherein
    (i) the valve element is a joint body that is a combination of (a) a seat member to be in contact with the valve seat and (b) a body member, or (ii) the valve seat is a joint body that is a combination of (a) a seat member to be in contact with the valve element and (b) a body member,
    the joint body is formed by machining a material joint body that is formed by welding together a seat-member material as a material for the seat member and a body-member material as a material for the body member, and
    the welding is performed on contact faces of the seat-member material and the body-member material of the material joint body in a range wider than contact faces of the seat member and the body member of the joint body.

2. The manufacturing method for the fluid control apparatus according to claim 1, wherein
    the seat-member material is molded by any one of injection molding and extrusion molding, and
    the seat member includes an abutment surface abutting on the valve element or the valve seat and the abutment surface is formed by a molded face of the seat-member material.

3. The manufacturing method for the fluid control apparatus according to claim 2, wherein the material joint body is formed by:
    a step of overlapping the seat-member material on the body-member material;
    a step of further overlapping an infrared-ray transmissive solid on the seat-member material overlapped with the body-member material; and
    a step of pressing the seat-member material against the body-member material by the infrared-ray transmissive solid and irradiating infrared beam to the seat-member material and the body-member material to weld the seat-member material and the body-member material.

4. The manufacturing method for the fluid control apparatus according to claim 2, wherein the material joint body is formed by:
    a step of holding a heat plate between the body-member material and the seat-member material and bringing the body-member material and the seat-member material into contact with the heat plate to melt faces of the body-member material and the seat-member material where the heat plate is contacted;
    a step of removing the heat plate which is held between the body-member material and the seat-member material; and
    a step of bringing molten faces of the body-member material and the seat-member material to be in contact and pressurizing and cooling the body-member material and the seat-member material from a vertical direction with respect to the molten faces to weld the body-member material and the seat-member material.

5. The manufacturing method for the fluid control apparatus according to claim 1, wherein the material joint body is formed by:
- a step of overlapping the seat-member material on the body-member material;
- a step of further overlapping an infrared-ray transmissive solid on the seat-member material overlapped with the body-member material; and
- a step of pressing the seat-member material against the body-member material by the infrared-ray transmissive solid and irradiating infrared beam to the seat-member material and the body-member material to weld the seat-member material and the body-member material.

6. The manufacturing method for the fluid control apparatus according to claim 1, wherein the material joint body is formed by:
- a step of holding a heat plate between the body-member material and the seat-member material and bringing the body-member material and the seat-member material into contact with the heat plate to melt faces of the body-member material and the seat-member material where the heat plate is contacted;
- a step of removing the heat plate which is held between the body-member material and the seat-member material; and
- a step of bringing molten faces of the body-member material and the seat-member material to be in contact and pressurizing and cooling the body-member material and the seat-member material from a vertical direction with respect to the molten faces to weld the body-member material and the seat-member material.

7. A manufacturing method for a fluid control apparatus that controls flow of a fluid by bringing a valve element into or out of contact with a valve seat, wherein
- the valve element is a joint body that is a combination of a seat member to be in contact with the valve seat and a first body member, and the valve seat is a joint body that is a combination of a seat member to be in contact with the valve element and a second body member,
- each joint body is formed by machining a material joint body that is formed by welding together a seat-member material as a material for the seat member and a body-member material as a material for the first body member or the second body member, and
- the welding is performed on contact faces of the seat-member material and the body-member material of the material joint body in a range wider than contact faces of the seat member and the body member of the joint body.

8. The manufacturing method for the fluid control apparatus according to claim 7, wherein
- the seat-member material is molded by any one of injection molding and extrusion molding, and
- the seat member includes an abutment surface abutting on the valve element or the valve seat and the abutment surface is formed by a molded face of the seat-member material.

9. The manufacturing method for the fluid control apparatus according to claim 7, wherein the material joint body is formed by:
- a step of overlapping the seat-member material on the body-member material;
- a step of further overlapping an infrared-ray transmissive solid on the seat-member material overlapped with the body-member material; and
- a step of pressing the seat-member material against the body-member material by the infrared-ray transmissive solid and irradiating infrared beam to the seat-member material and the body-member material to weld the seat-member material and the body-member material.

10. The manufacturing method for the fluid control apparatus according to claim 7, wherein the material joint body is formed by:
- a step of holding a heat plate between the body-member material and the seat-member material and bringing the body-member material and the seat-member material into contact with the heat plate to melt faces of the body-member material and the seat-member material where the heat plate is contacted;
- a step of removing the heat plate which is held between the body-member material and the seat-member material; and
- a step of bringing molten faces of the body-member material and the seat-member material to be in contact and pressurizing and cooling the body-member material and the seat-member material from a vertical direction with respect to the molten faces to weld the body-member material and the seat-member material.

* * * * *